US011595669B2

(12) United States Patent
Ma et al.

(10) Patent No.: US 11,595,669 B2
(45) Date of Patent: Feb. 28, 2023

(54) CHROMA BLOCK PREDICTION METHOD AND APPARATUS

(71) Applicant: HUAWEI TECHNOLOGIES CO., LTD., Guangdong (CN)

(72) Inventors: Xiang Ma, Shenzhen (CN); Jianle Chen, San Diego, CA (US); Haitao Yang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/303,976

(22) Filed: Jun. 11, 2021

(65) Prior Publication Data

US 2021/0314581 A1 Oct. 7, 2021

Related U.S. Application Data

(63) Continuation of application No. PCT/CN2019/120984, filed on Nov. 26, 2019.

(30) Foreign Application Priority Data

Dec. 13, 2018 (CN) .......................... 201811527100.4

(51) Int. Cl.
*H04N 19/196* (2014.01)
*H04N 19/132* (2014.01)
(Continued)

(52) U.S. Cl.
CPC ......... *H04N 19/196* (2014.11); *H04N 19/132* (2014.11); *H04N 19/159* (2014.11);
(Continued)

(58) Field of Classification Search
None
See application file for complete search history.

(56) References Cited

U.S. PATENT DOCUMENTS 10,477,205 B1\* 11/2019 Sim ...................... H04N 19/176
2012/0328013 A1  12/2012 Budagavi et al.
(Continued)

FOREIGN PATENT DOCUMENTS

CN  103918269 A  7/2014
CN  104471940 A  3/2015
(Continued)

OTHER PUBLICATIONS

Zhang et al., "Enhanced Cross-Component Linear Model for Chroma Intra-Prediction in Video Coding," IEEE Transactions on Image Processing, vol. 27, No. 8 Aug. 2018.\*
(Continued)

*Primary Examiner* — Michael J Hess
(74) *Attorney, Agent, or Firm* — Womble Bond Dickinson (US) LLP

(57) ABSTRACT

This application provides a chroma block prediction method and apparatus. The method includes: obtaining a maximum luma value and a minimum luma value based on luma samples corresponding to neighboring samples of a target chroma block, and calculating a first difference between the maximum luma value and the minimum luma value; if the first difference is not equal to 0, processing the first difference based on a quantity of significant bits of the first difference and a first preset bit depth to obtain a second difference; and determining, based on a first chroma value, a second chroma value, and the second difference, an intra prediction model parameter corresponding to the target chroma block, and determining prediction information of the target chroma block based on the intra prediction model parameter and luma reconstruction information corresponding to the target chroma block.

20 Claims, 12 Drawing Sheets

(51) Int. Cl.
  *H04N 19/159*  (2014.01)
  *H04N 19/176*  (2014.01)
  *H04N 19/186*  (2014.01)
  *H04N 19/593*  (2014.01)

(52) U.S. Cl.
  CPC ......... *H04N 19/176* (2014.11); *H04N 19/186* (2014.11); *H04N 19/593* (2014.11)

(56) References Cited

U.S. PATENT DOCUMENTS

| | | | | |
|---|---|---|---|---|
| 2018/0176594 | A1* | 6/2018 | Zhang | H04N 19/593 |
| 2018/0205946 | A1* | 7/2018 | Zhang | H04N 19/103 |
| 2019/0327466 | A1* | 10/2019 | Ikai | H04N 19/176 |
| 2020/0288135 | A1* | 9/2020 | Laroche | H04N 19/105 |

FOREIGN PATENT DOCUMENTS

| | | |
|---|---|---|
| CN | 105306944 A | 2/2016 |
| CN | 107211124 A | 9/2017 |
| EP | 3900332 A1 | 10/2021 |
| GB | 2505640 A | 3/2014 |
| WO | 2020132556 A2 | 6/2020 |
| WO | 2020141985 A1 | 7/2020 |

OTHER PUBLICATIONS

Jiang et al., "CE3: Multiple neighbor-based linear model (Test 5.3.1)," JVET-L0388r1, JVET 12th Meeting: Macao, CN Oct. 3-12, 2018.*

Wang et al., "CE3: Adaptive multiple cross-component linear model (Test 5.9.1)," JVET-L0419, JVET 12th Meeting: Macao, CN Oct. 3-12, 2018.*

Zhang et al., "Multi-model Based Cross-component Linear Model Chroma Intra-Prediction for Video Coding," VCIP 2017, Dec. 10-13, 2017.*

Zhang et al., "Chroma Intra Prediction Based on Inter-Channel Correlation for HEVC," IEEE Transactions on Image Processing, vol. 23, No. 1, Jan. 2014.*

Canon, Non-CE3: On cross-component linear model simplification, JVET-K0204-v3, Joint Video Experts Team (JVET) of ITU-T SG 16 WP 3 and ISO/IEC JTC 1/SC 29/WG 11, 11th Meeting: Ljubljana, SI, Jul. 10-18, 2018, 7 pages.

ITU-T H.261 (Mar. 1993), Line Transmission of Non-Telephone Signals, Video Codec for Audiovisual Services at p x 64 kbits, total 29 pages.

Canon, CE3-5.1: On cross-component linear model simplification, JVET-L0191, Joint Video Experts Team (JVET) of ITU-T SG 16 WP 3 and ISO/IEC ITC 1/SC 29/WG 11, 12th Meeting: Macao, CN, Oct. 3-12, 2018, 5 pages.

ITU-T H.263(Jan. 2005), Series H: Audiovisual and Multimedia Systems, Infrastructure of audiovisual services—Coding of moving video, Video coding for low bit rate communication, total 226 pages.

ITRI International, CE3: Adaptive multiple cross-component linear model (Test 5.9.1), JVET-L0419, Joint Video Experts Team (JVET) of ITU-T SG 16 WP 3 and ISO/IEC ITC 1/SC 29/WG11, 12th Meeting: Macao, CN, Oct. 3-12, 2018, 4 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

Sullivan (Microsoft) G J et al: "Meeting Report of the 7th JVETMeeting", 7. JVET Meeting; Jul. 13, 2017-Jul. 21, 2017; Torino; (The Jointvideo Exploration Team of ISO/IEC JTC1/SC29/WG11 and ITU-TSG.16 ), No. JVET-G1000 Oct. 18, 2017 (Oct. 18, 2017), XP030150979,Retrieved from the Internet: URL:http://phenix.int-evry.fr/jvet/doc_end_user/documents/7 Torino/wg11 /JVET-G1 OOO-v1.zip JVET-G1000.doc [retrievedon Oct. 18, 2017].

Y-W Chen (Kwai) et al: "CE3: Simplification of LM mode (CE3-1.6)", 14.JVET Meeting; Mar. 19, 2019-Mar. 27, 2019; Geneva; (The Joint Videoexploration Team of ISO/IEC JTC1/SC29/WG11 and ITU-T SG.16 ),No. JVET-N0321 Mar. 13, 2019 (Mar. 13, 2019), XP030202966, Retrievedfrom the Internet: URL:http://phenix.int-evry.fr/jvet/doc_end_user/documents/14_Geneva/wg11 /JVET-N0321-v1.zip JVEI-N0321.docx[retrieved on Mar. 13, 2019].

Hsu J et al: "Simplified Parameter Calculation for Chroma LM Mode", 9. JCT-VC Meeting; Apr. 27, 2012-May 7, 2012; Geneva; (Jointcollaborative Team On Video Coding of ISO/IEC JTC1/SC29/WG11 and ITU-T SG.16), No. JCTVC-I0166 Apr. 28, 2012 (Apr. 28, 2012), XP030233809, Retrieved from the Internet:URL:http://phenix.int-evry.fr/ict/doc_end_user/documents/9_Geneva/wg11/JCTVC-10166-v2.zip JCTVC-10166.doc[retrieved on Apr. 28, 2012].

* cited by examiner (a) 4:4:4 format  (b) 4:2:2 format  (c) 4:2:0 format

CHROMA BLOCK PREDICTION METHOD AND APPARATUS

CROSS-REFERENCE TO RELATED APPLICATIONS

This application is a continuation of International Application No. PCT/CN2019/120984, filed on Nov. 26, 2019, which claims priority to Chinese Patent Application No. 201811527100.4 filed on Dec. 13, 2018, The disclosures of the aforementioned applications are hereby incorporated by reference in their entireties.

BACKGROUND

With development of internet technologies, there are more video application programs, and there are increasing requirements for high-definition videos in the video application programs. However, because the high-definition videos require a comparatively large amount of data, the high-definition videos need to be encoded if they need to be transmitted in limited network bandwidth. Generally, encoding processing mainly includes intra prediction, inter prediction, transformation, quantization, entropy encoding, in-loop filtering, and the like.

In a related technology, when intra prediction is performed, for any chroma block, a cross-component linear mode (CCLM) may be used to determine prediction information. The cross-component linear mode may also be referred to as a cross-component prediction (CCP) mode or cross-component intra prediction (CCIP). The cross-component linear mode is a chroma intra prediction method using correlation between luma and chroma. The chroma intra prediction method uses a reconstructed luma component to derive prediction information of a current chroma block according to the linear model, and may use the following equation: $pred_C(i,j)=\alpha*rec_L'(i,j)+\beta$, where $\alpha$ and $\beta$ are intra prediction model parameters, $\alpha$ is a scaling coefficient, $\beta$ is an offset factor, $pred_C(i,j)$ is a prediction value of chroma samples at a location $(i,j)$, and $rec_L'(i,j)$ is a luma reconstructed sample value at the location $(i,j)$ after a luma reconstructed block corresponding to the current chroma block is downsampled to a chroma component resolution. The scaling coefficient and the offset factor do not need to be encoded and transmitted, but are derived using boundary samples of a neighboring reconstructed block of the current chroma block and luma samples at a corresponding location of the boundary sample.

In this way, an intra prediction model parameter needs to be determined for each chroma block using the CCLM. However, in the related technology, determining the intra prediction model parameter is comparatively complex, and therefore prediction efficiency of the chroma block is comparatively low.

SUMMARY

To resolve problems in the related technology, embodiments of this application provide a chroma block prediction method and apparatus. Technical solutions are as follows.

According to a first aspect, a chroma block prediction method is provided. The method includes:

obtaining a maximum luma value and a minimum luma value based on luma samples corresponding to neighboring samples of a target chroma block; if a first difference between the maximum luma value and the minimum luma value is greater than 0, processing the first difference based on a quantity of significant bits of the first difference and a first preset bit depth (bit-depth) to obtain a second difference, where a bit depth of the second difference is less than a bit depth of the first difference; determining, based on a first chroma value, a second chroma value, and the second difference, an intra prediction model parameter corresponding to the target chroma block, where the first chroma value and the second chroma value are determined based on the neighboring samples of the target chroma block; and determining prediction information of the target chroma block based on the intra prediction model parameter and luma reconstruction information corresponding to the target chroma block.

In the solution described in this embodiment of this application, when determining is performed until a current chroma block (which may be referred to as a target chroma block), a coding scheme of the target chroma block may be determined. If the coding scheme is a CCLM, the neighboring samples of the target chroma block may be determined, and then the maximum luma value and the minimum luma value are determined based on the neighboring samples. Then, a difference between the maximum luma value and the minimum luma value, namely, the first difference, may be determined. Whether the first difference is greater than 0 is determined. If the first difference is greater than 0, the quantity of significant bits of the first difference are determined, and the first difference is processed based on the quantity of significant bits of the first difference and the first preset bit depth to obtain the second difference, where the bit depth of the second difference is less than the bit depth of the first difference.

Then, the intra prediction model parameter corresponding to the target chroma block may be determined based on the first chroma value, the second chroma value, and the second difference, where the first chroma value and the second chroma value are determined based on the neighboring samples of the target chroma block. The intra prediction model parameter includes a scaling coefficient (which may also be referred to as a target scaling coefficient) and an offset factor (which may also be referred to as a target offset factor). The luma reconstruction information corresponding to the target chroma block is obtained, and then the prediction information of the target chroma block is determined based on the determined intra prediction model parameter and the luma reconstruction information corresponding to the target chroma block.

In this way, when the scaling coefficient is determined, the first difference between the maximum luma value and the minimum luma value is processed based on the quantity of significant bits of the first difference and the first preset bit depth to obtain the second difference, where the bit depth of the second difference is less than the bit depth of the first difference. This can reduce a calculation amount for determining the scaling coefficient, further reduce a calculation amount for determining the offset factor, lower calculation complexity of the intra prediction model parameter, and improve prediction efficiency of a chroma block.

In an embodiment, the obtaining a maximum luma value and a minimum luma value based on luma samples corresponding to neighboring samples of a target chroma block includes: obtaining the maximum luma value and the minimum luma value in the luma samples corresponding to the neighboring samples of the target chroma block.

In the solution described in this embodiment of this application, when determining is performed until the current chroma block (which may be referred to as the target chroma block), the coding scheme of the target chroma block may be determined. If the coding scheme is the CCLM, the neighboring samples of the target chroma block may be determined. Then, the maximum luma value and the minimum luma value in luma samples corresponding to these samples are determined. When the first chroma value and the second chroma value are determined, a chroma value of chroma samples corresponding to luma samples to which the maximum luma value belongs may be determined as the first chroma value, and a chroma value of chroma samples corresponding to luma samples to which the minimum luma value belongs may be determined as the second chroma value.

In an embodiment, the obtaining a maximum luma value and a minimum luma value based on luma samples corresponding to neighboring samples of a target chroma block includes: dividing a preset quantity of luma samples corresponding to a preset quantity of neighboring samples of the target chroma block into a first luma sample set and a second luma sample set, where a quantity of luma samples in the first luma sample set is the same as a quantity of luma samples in the second luma sample set, and luma values of the luma samples in the first luma sample set are greater than or equal to luma values of the luma samples in the second luma sample set; and determining the maximum luma value based on the first luma sample set, and determining the minimum luma value based on the second luma sample set.

In the solution described in this embodiment of this application, when determining is performed until the current chroma block (which may be referred to as the target chroma block), the coding scheme of the target chroma block may be determined. If the coding scheme is the CCLM, the neighboring samples of the target chroma block may be determined. Then, a preset quantity of chroma samples (may be preset to, for example, 4) are selected from chroma samples of these samples, and then a target quantity of luma samples corresponding to each chroma sample in the preset quantity of chroma samples are obtained based on the preset quantity of chroma samples, weighting processing is separately performed on luma values of the target quantity of luma samples corresponding to each chroma sample, to obtain luma values of the preset quantity of luma samples (a process of performing weighting processing on the luma values of the target quantity of luma samples to obtain the luma values of the luma samples may be referred to as a downsampling process).

Then, the preset quantity of luma samples is divided into the first luma sample set and the second luma sample set. The quantity of luma samples included in the first luma sample set is the same as the quantity of luma samples included in the second luma sample set. The luma value of each luma sample in the first luma sample set is greater than or equal to the luma value of each luma sample in the second luma sample set. Then, an average value is taken in the luma values of the luma samples in the first luma sample set, to obtain the maximum luma value, and an average value is taken in the luma values of the luma samples in the second luma sample set, to obtain the minimum luma value. An obtained average value of chroma samples of the luma samples in the first luma sample set is determined as the first chroma value, and an obtained average value of chroma samples of the luma samples in the second luma sample set is determined as the second chroma value.

In an embodiment, the first chroma value corresponds to the maximum luma value, and the second chroma value corresponds to the minimum luma value.

In an embodiment, the processing the first difference to obtain a second difference includes: shifting the first difference to the right to obtain the second difference.

In the solution described in this embodiment of this application, after the first difference is determined, the first difference may be shifted to the right based on the quantity of significant bits of the first difference and the first preset bit depth, to obtain the second difference.

In an embodiment, a third difference between the quantity of significant bits of the first difference and the first preset bit depth is determined. The first difference is shifted to the right based on the third difference to obtain the second difference, where the third difference is greater than 0.

In the solution described in this embodiment of this application, the difference between the maximum luma value and the minimum luma value, namely, the first difference, may be determined. Then, whether the first difference is greater than 0 may be determined. If the first difference is greater than 0, the quantity of significant bits of the first difference may be determined, and the prestored first preset bit depth may be obtained. Then, a difference between the quantity of significant bits of the first difference and the first preset bit depth, namely, the third difference, may be determined.

Then, whether the third difference is greater than 0 may be determined. If the third difference is greater than 0, the first difference may be shifted to the right based on the third difference to obtain the second difference.

In this way, instead of directly shifting the first difference to the right by bits of the first preset bit depth, a difference between the first difference and the first preset bit depth is used as a quantity of bits shifted to the right, and the significant bits of the first difference may be retained as much as possible. This can improve coding performance.

In an embodiment, the first difference is shifted to the right by bits of the third difference, to obtain the second difference.

In this way, instead of directly shifting the first difference to the right by bits of the first preset bit depth, a difference between the first difference and the first preset bit depth is used as a quantity of bits shifted to the right, and the significant bits of the first difference may be retained as much as possible. This can improve coding performance.

In an embodiment, the intra prediction model parameter corresponding to the target chroma block is determined based on the first chroma value, the second chroma value, a preset value of a normalized shift parameter, the second difference, and the minimum luma value.

The normalized shift parameter is used to perform shift processing, and the preset value of the normalized shift parameter may be preset and stored in an apparatus mentioned below.

In the solution described in this embodiment of this application, each chroma block using the CCLM corresponds to an intra prediction model parameter, and the intra prediction model parameter includes an offset factor and a scaling coefficient. A scaling coefficient and an offset factor corresponding to the target chroma block may be determined based on the first chroma value, the second chroma value, the preset value of the normalized shift parameter, the second difference, the minimum luma value, and a preset formula.

In an embodiment, the scaling coefficient in the intra prediction model parameter corresponding to the target chroma block is determined based on the first chroma value, the second chroma value, the second difference, and the preset value. The offset factor in the intra prediction model parameter corresponding to the target chroma block is determined based on the scaling coefficient, the second chroma value, a target value of the normalized shift parameter, and the minimum luma value.

In the solution described in this embodiment of this application, the preset value of the normalized shift parameter may be obtained, and the preset value is a parameter value preset for the normalized shift parameter. Then, the first chroma value, the second chroma value, the preset value of the normalized shift parameter, and the second difference may be input into a preset formula to obtain the scaling coefficient corresponding to the target chroma block, and then the scaling coefficient, the preset value of the normalized shift parameter, and the minimum luma value are input into another preset formula, to obtain the offset factor corresponding to the target chroma block.

In an embodiment, the determining, based on the scaling coefficient, the second chroma value, the preset value of the normalized shift parameter, and the minimum luma value, an offset factor in the intra prediction model parameter corresponding to the target chroma block includes: determining, based on the scaling coefficient, the second chroma value, the target value of the normalized shift parameter, and the minimum luma value, the offset factor in the intra prediction model parameter corresponding to the target chroma block, where the target value of the normalized shift parameter is determined based on the preset value of the normalized shift parameter.

In the solution described in this embodiment of this application, the target value of the normalized shift parameter is determined based on the preset value of the normalized shift parameter, and the offset factor in the intra prediction model parameter corresponding to the target chroma block is determined based on the scaling coefficient, the second chroma value, the target value of the normalized shift parameter, and the minimum luma value. In this way, because the target value of the normalized shift parameter is used, the determined intra prediction parameter can be more accurate.

In an embodiment, $$a = (\max C - \min C) * \text{Floor}\left(\frac{2^N}{\text{diff}}\right),$$

where a is the scaling coefficient, diff is the second difference, maxC is the first chroma value, minC is the second chroma value, and N is the preset value.

In the solution described in this embodiment of this application, the scaling coefficient is determined according to a formula $$a = (\max C - \min C) * \text{Floor}\left(\frac{2^N}{\text{diff}}\right).$$

Because diff is shifted to the right relative to the first difference, $$\text{Floor}\left(\frac{2^N}{\text{diff}}\right)$$

may be determined through a lookup table. This lowers complexity.

In an embodiment, $$a = (\max C - \min C) * \text{Floor}\left(\frac{2^N}{\text{diff}}\right) + div,$$

where $$div = \left((\max C - \min C) * \text{Floor}\left(\frac{2^{2N}}{\text{diff}}\right) - \text{Floor}\left(\frac{2^N}{\text{diff}}\right) * 2^N + 2^{N-1}\right) >> N,$$

a is the scaling coefficient, diff is the second difference, maxC is the first chroma value, minC is the second chroma value, and N is the preset value.

In the solution described in this embodiment of this application, the scaling coefficient is determined according to a formula $$a = (\max C - \min C) * \text{Floor}\left(\frac{2^N}{\text{diff}}\right) + div.$$

diff is shifted to the right relative to the first difference, and $$\text{Floor}\left(\frac{2^N}{\text{diff}}\right)$$

may be determined through a lookup table. Therefore, this lowers complexity.

In an embodiment, $$\text{Floor}\left(\frac{2^N}{\text{diff}}\right)$$

may be determined through a lookup table. This increases a processing speed.

In an embodiment, an initial scaling coefficient in the intra prediction model parameter corresponding to the target chroma block is determined based on the first chroma value, the second chroma value, the preset value, and the second difference. If a fourth difference between a quantity of significant bits of the initial scaling coefficient and a second preset bit depth is greater than 0, the initial scaling coefficient is shifted to the right based on the fourth difference to obtain the scaling coefficient in the intra prediction model parameter corresponding to the target chroma block.

In the solution described in this embodiment of this application, the initial scaling coefficient in the intra prediction model parameter corresponding to the target chroma block may be determined based on the first chroma value, the second chroma value, the preset value, and the second difference. For this process, refer to the foregoing implementation 1 or implementation 2. Then, the second preset bit depth corresponding to the scaling coefficient may be obtained, the fourth difference between the quantity of significant bits of the initial scaling coefficient and the second preset bit depth is determined, and whether the fourth difference is greater than 0 is determined. If the fourth difference is greater than 0, the initial scaling coefficient is shifted to the right based on the fourth difference to obtain the scaling coefficient corresponding to the target chroma block.

In this way, after the initial scaling coefficient is shifted to the right, a bit depth of the scaling coefficient is reduced. Therefore, this can lower complexity of subsequently determining multiplication in the prediction information.

In an embodiment, the initial scaling coefficient is shifted to the right by bits of the fourth difference, to obtain the scaling coefficient in the intra prediction model parameter corresponding to the target chroma block.

In an embodiment, the method further includes: if the fourth difference is greater than 0, determining a difference between the fourth difference and a sum of the preset value of the normalized shift parameter and the third difference as the target value of the normalized shift parameter.

In the solution described in this embodiment of this application, if the fourth difference is greater than 0, the difference between the fourth difference and the sum of the preset value of the normalized shift parameter and the third difference may be determined as the target value of the normalized shift parameter.

In an embodiment, the second preset bit depth is a bit depth of an intra interpolation filter coefficient.

In the solution described in this embodiment of this application, the second preset bit depth is set to the bit depth of the intra interpolation filter coefficient, to align with complexity of intra prediction.

In an embodiment, the determining, based on the scaling coefficient, the second chroma value, a target value, and the minimum luma value, the offset factor in the intra prediction model parameter corresponding to the target chroma block includes:

b=minC−((a*minY)>>k), where b is the offset factor, a is the scaling coefficient, minC is the second chroma value, minY is the minimum luma value, and k is the target value.

In the solution described in this embodiment of this application, a preset offset factor calculation formula b=minC−((a*minY)>>k) may be obtained, which indicates that a difference between minC and a value obtained after a*minY is shifted by k bits to the right is obtained, to obtain the offset factor b corresponding to the target chroma block. The scaling coefficient a, the second chroma minC, the target value k of the normalized shift parameter, and the minimum luma value minY are substituted into the formula, to determine the offset factor b corresponding to the target chroma block. K=N+shiftLuma, where shiftLuma is the third difference mentioned above.

In an embodiment, the method further includes: if the first difference is not greater than 0, determining that the scaling coefficient in the intra prediction model parameter is 0, and determining that the offset factor in the intra prediction model parameter is the second chroma value.

In the solution described in this embodiment of this application, if the first difference is not greater than 0, the scaling coefficient may be determined as 0. Then, the second chroma value, the target value of the normalized shift parameter, and the minimum luma value are substituted into the formula b=minC−((a*minY)>>k), to obtain that b=minC. In other words, the offset factor is the second chroma value. In this way, the intra prediction model parameter corresponding to the target chroma block may be determined when the first difference is not greater than 0.

In an embodiment, the preset value of the normalized shift parameter is the bit depth of the first difference, a bit depth of luma samples, a sum of the bit depth of the first difference and a second preset value, a product of the bit depth of the first difference and a third preset value, or a bit depth of one byte.

The second preset value is a positive integer, for example, 4 bits. The third preset value is a positive integer, for example, 2 bits.

In the solution described in this embodiment of this application, the preset value of the normalized shift parameter may be set to the bit depth of the first difference. The preset value of the normalized shift parameter may also be set to the bit depth of luma samples.

The preset value of the normalized shift parameter may also be set to the sum of the bit depth of the first difference and the second preset value. For example, the bit depth of the first difference is 4 bits, the second preset value is 4 bits, and the preset value of the normalized shift parameter may be 8 bits.

The preset value of the normalized shift parameter may also be set to the product of the bit depth of the first difference and the third preset value. For example, the bit depth of the first difference is 4 bits, the third preset value is 2, and the preset value of the normalized shift parameter is 8 bits.

The preset value of the normalized shift parameter may be set to the bit depth of one byte.

In this way, the preset value of the normalized shift parameter may be adjusted to any one of the foregoing values, and is less than 16 in the related technology. This can reduce a bit depth of a value in the table for subsequent lookup, and therefore reduce a data amount of the table.

In an embodiment, the first preset bit depth is less than the bit depth of luma samples.

In an embodiment, the luma reconstruction information corresponding to the target chroma block includes down-sampling information of a luma reconstruction block corresponding to the target chroma block.

According to a second aspect, a chroma block prediction apparatus is provided. The prediction apparatus includes a processor and a memory. The memory is configured to store computer instructions executed by the processor, and the processor executes the instructions to implement the chroma block prediction method according to the first aspect.

According to a third aspect, a chroma block prediction apparatus is provided. The apparatus includes one or more modules that are configured to implement the chroma block prediction method according to the first aspect.

According to a fourth aspect, a computer-readable storage medium is provided. The computer-readable storage medium stores computer instructions. When the computer instructions in the computer-readable storage medium are run on a computing device, the computing device is enabled to perform the chroma block prediction method according to the first aspect.

According to a fifth aspect, a computer program product including instructions is provided. When the computer program product runs on a computing device, the computing device is enabled to perform the chroma block prediction method according to the first aspect.

The technical solutions provided in the embodiments of this application bring at least the following beneficial effects:

In the embodiments of this application, when determining prediction information of a target chroma block, a chroma block prediction apparatus may obtain a maximum luma value and a minimum luma value based on luma samples corresponding to neighboring samples of the target chroma block, and then determine a first difference between the maximum luma value and the minimum luma value. If the first difference is greater than 0, the first difference may be processed based on a quantity of significant bits of the first difference and a first preset bit depth to obtain a second difference, where a bit depth of the second difference is less than a bit depth of the first difference. Then, an intra prediction model parameter corresponding to the target chroma block is determined based on a first chroma value, a second chroma value, and the second difference, and then the prediction information of the target chroma block is determined based on the intra prediction model parameter and luma reconstruction information corresponding to the target chroma block. In this way, when the intra prediction model parameter is determined, the first difference between the maximum luma value and the minimum luma value is processed based on the quantity of significant bits of the first difference and the first preset bit depth, so that the bit depth of the second difference is less than the bit depth of the first difference. This can reduce a calculation amount of the intra prediction model parameter, and improve prediction efficiency of the chroma block.

DESCRIPTION OF EMBODIMENTS

Figure 1:
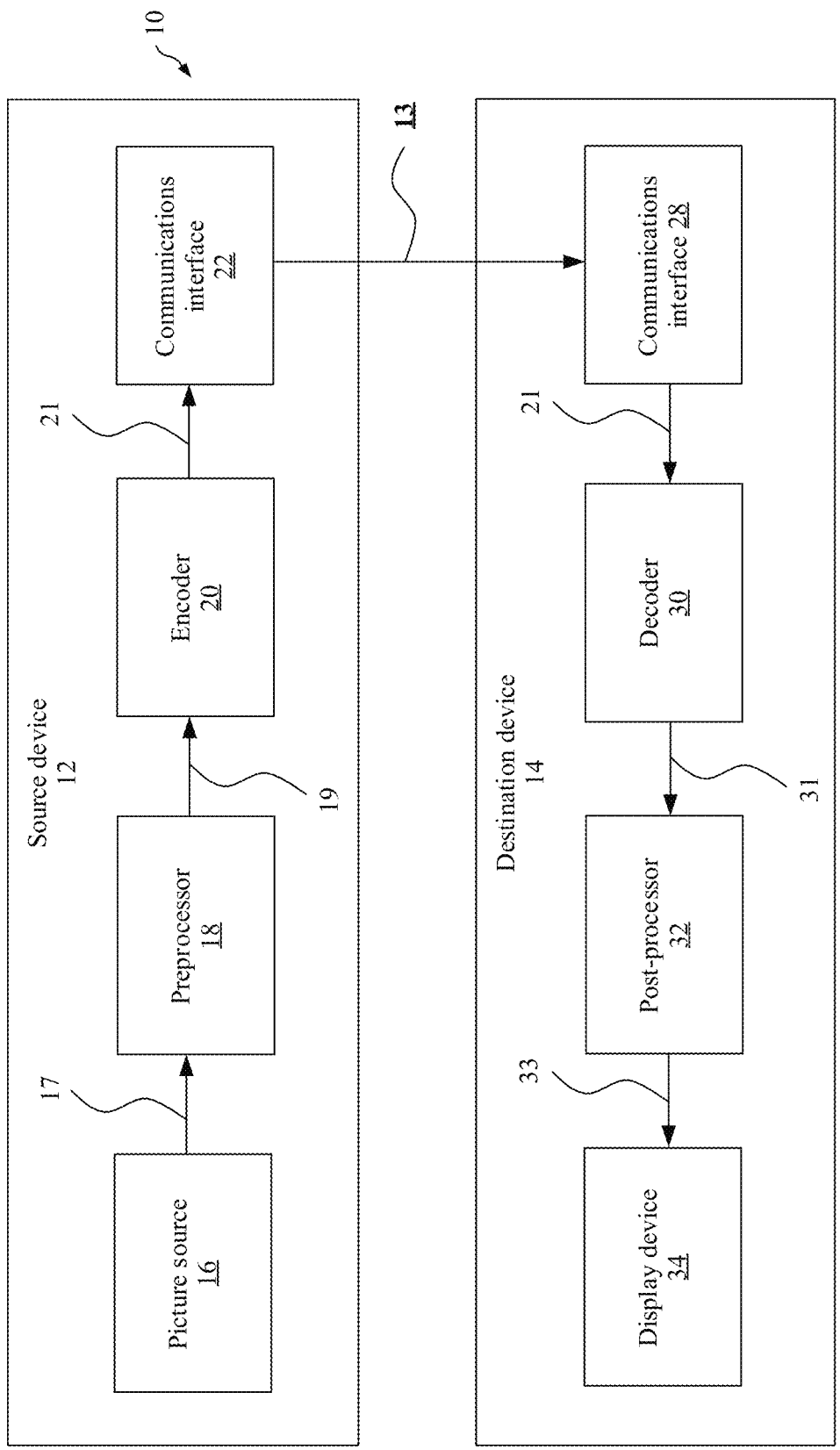
FIG. 1 is a block diagram of an example of a video coding system used to implement an embodiment of this application.

To make objectives, technical solutions, and advantages of this application clearer, the following further describes implementations of this application in detail with reference to the accompanying drawings.

To facilitate understanding of this application, the following first describes a system architecture and concepts in this application.

Video coding typically refers to processing of a sequence of pictures, where the sequence of pictures forms a video or a video sequence. In the field of video coding, terms "picture", "frame", and "image" may be used as synonyms. Video coding used in this application (or this disclosure) indicates either video encoding or video decoding. Video encoding is performed on a source side, and usually includes processing (for example, through compression) an original video picture to reduce an amount of data for representing the video picture, for more efficient storage and/or transmission. Video decoding is performed on a destination side, and typically includes inverse processing in comparison with the encoder to reconstruct a video picture. "Coding" of a video picture in the embodiments should be understood as "encoding" or "decoding" of a video sequence. A combination of the encoding part and the decoding part is also referred to as encoding and decoding (or CODEC for short).

Each picture of a video sequence is usually partitioned into a set of non-overlapping blocks, and coding is usually performed at a block level. In other words, on an encoder side, a video is usually processed, that is, encoded, at a block (which is also referred to as a picture block or a video block) level. For example, a prediction block is generated through spatial (intra-picture) prediction and temporal (inter-picture) prediction, the prediction block is subtracted from a current block (a block that is currently being processed or to be processed) to obtain a residual block, and the residual block is transformed in a transform domain and quantized to reduce an amount of data that is to be transmitted (compressed). On a decoder side, an inverse processing part relative to the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, subsequent blocks.

The term "block" may be a part of a picture or a frame. Key terms in this application are defined as follows:

Current block: a block that is being processed. For example, in encoding, a current block is a block that is currently being encoded. In decoding, a current block is a block that is being decoded. If the block that is being processed is a chroma component block, it is referred to as a current chroma block. A luma block corresponding to the current chroma block may be referred to as a current luma block.

Reference block: a block that provides a reference signal for a current block. In a search process, a plurality of reference blocks may be traversed to find an optimal reference block.

Prediction block: a block that provides prediction for a current block. For example, after a plurality of reference blocks are traversed to find an optimal reference block. The optimal reference block provides prediction for the current block, and this block is referred to as a prediction block.

Picture block signal: a sample value, a sampling value, or a sampling signal in a picture block.

Prediction signal: a sample value, a sampling value, or a sampling signal in a prediction block.

The following describes embodiments of an encoder 20, a decoder 30, and a coding system 10 with reference to FIG. 1, and FIG. 2 to FIG. 4.

FIG. 1 is a conceptual or schematic block diagram of an example coding system 10, for example, a video coding system 10 that may use a technology of this application (this disclosure). The encoder 20 (for example, a video encoder 20) and the decoder 30 (for example, a video decoder 30) of the video coding system 10 represent example devices that may be configured to perform intra prediction based on various examples described in this application. As shown in FIG. 1, the coding system 10 includes a source device 12 configured to provide encoded data 13 such as an encoded picture 13 to, for example, a destination device 14 that decodes the encoded data 13.

The source device 12 includes the encoder 20, and in an embodiment, may include a picture source 16, for example, a preprocessing unit 18 of a picture preprocessing unit 18, and a communications interface or communications unit 22.

The picture source 16 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (virtual reality, VR) picture); and/or any combination thereof (for example, an augmented reality (augmented reality, AR) picture).

A picture may be considered as a two-dimensional array or matrix of samples with luma values. A sample in the array may also be referred to as a pixel (pixel) (a short form of picture element (picture element)) or a pel (pel). A quantity of samples in horizontal and vertical directions (or axes) of the array or the picture defines a size and/or a resolution of the picture. For representation of a color, typically three color components are used. To be specific, the picture may be represented as or include three sample arrays. In an RGB format or a color space, a picture includes corresponding red, green and blue sample arrays. However, in video coding, each sample is usually represented in a luma/chroma format or a color space, for example, YCbCr, which includes a luma component indicated by Y (sometimes indicated by L instead) and two chroma components indicated by Cb and Cr. The luminance (luma for short) component Y represents brightness or gray level intensity (for example, both are the same in a gray-scale picture), and the two chrominance (chroma for short) components Cb and Cr represent chroma or color information components. Correspondingly, a picture in a YCbCr format includes a luma sample array of luma sample values (Y), and two chroma sample arrays of chroma values (Cb and Cr). A picture in an RGB format may be transformed or converted into a picture in a YCbCr format and vice versa. This process is also referred to as color conversion or transform. If a picture is monochrome, the picture may include only a luma sample array.

The picture source 16 (for example, a video source 16) may be, for example, a camera for capturing a picture, or a memory such as a picture memory, including or storing a previously captured or generated picture, and/or any type of interface (internal or external) for obtaining or receiving a picture. The camera may be, for example, a local camera, or a camera integrated in the source device, and the memory may be a local memory or, for example, a memory integrated in the source device. The interface may be, for example, an external interface to receive a picture from an external video source. The external video source is, for example, an external picture capturing device such as a camera, an external memory, or an external picture generation device. The external picture generation device is, for example, an external computer graphics processor, a computer or a server. The interface may be any type of interface, for example, a wired or wireless interface or an optical interface, according to any proprietary or standardized interface protocol. An interface for obtaining picture data 17 may be a same interface as or a part of the communications interface 22.

Different from the preprocessing unit 18 and processing performed by the preprocessing unit 18, the picture or picture data 17 (for example, video data 16) may also be referred to as a raw picture or raw picture data 17.

The preprocessing unit 18 is configured to receive the (raw) picture data 17 and perform preprocessing on the picture data 17 to obtain a preprocessed picture 19 or preprocessed picture data 19. For example, the preprocessing performed by the preprocessing unit 18 may include trimming, color format conversion (for example, from RGB to YCbCr), color correction, or denoising. It may be understood that the preprocessing unit 18 may be an optional component.

The encoder 20 (for example, the video encoder 20) is configured to receive the preprocessed picture data 19 and provide encoded picture data 21 (details are further described below, for example, based on FIG. 3 or FIG. 5). In an example, the encoder 20 may be configured to perform the following Embodiments 1 to 7.

The communications interface 22 of the source device 12 may be configured to receive the encoded picture data 21 and transmit the encoded picture data 21 to another device, for example, the destination device 14 or any other device, for storage or direct reconstruction. Alternatively, the communications interface 22 is configured to process the encoded picture data 21 before correspondingly storing encoded data 13 and/or transmitting the encoded data 13 to another device. The another device is, for example, the destination device 14 or any other device used for decoding or storage.

The destination device 14 includes the decoder 30 (for example, the video decoder 30), and in an embodiment may include a communications interface or communications unit 28, a post-processing unit 32 and a display device 34.

The communications interface 28 of the destination device 14 is configured to, for example, receive the encoded picture data 21 or the encoded data 13 directly from the source device 12 or any other source. The any other source is, for example, a storage device. The storage device is, for example, an encoded picture data storage device.

The communications interface 22 and the communications interface 28 may be configured to transmit or receive the encoded picture data 21 or the encoded data 13 through a direct communications link between the source device 12 and the destination device 14 or through any type of network. The direct communications link is, for example, a direct wired or wireless connection. The any type of network is, for example, a wired or wireless network or any combination thereof, or any type of private or public network, or any combination thereof.

The communications interface 22 may be, for example, configured to package the encoded picture data 21 into an appropriate format, for example, a packet, for transmission over a communications link or communications network.

The communications interface 28 forming a corresponding part of the communications interface 22 may be, for example, configured to de-package the encoded data 13, to obtain the encoded picture data 21.

Both the communications interface 22 and the communications interface 28 may be configured as unidirectional communications interfaces, as indicated by an arrow that points from the source device 12 to the destination device 14 and that is used for the encoded picture data 13 in FIG. 1, or may be configured as bidirectional communications interfaces, and may be configured to, for example, send and receive messages to establish a connection, and acknowl-boundary and exchange any other information related to a communications link and/or data transmission such as encoded picture data transmission.

The decoder 30 is configured to receive the encoded picture data 21 and provide decoded picture data 31 or a decoded picture 31 (details are further described below, for example, based on FIG. 4 or FIG. 6). In an example, the decoder 30 may be configured to perform the following Embodiments 1 to 7.

The post-processor 32 of the destination device 14 is configured to post-process the decoded picture data 31 (also referred to as reconstructed picture data), for example, the decoded picture 131, to obtain post-processed picture data 33, for example, a post-processed picture 33. The post-processing performed by the post-processing unit 32 may include, for example, color format conversion (for example, from YCbCr to RGB), color correction, trimming, or re-sampling, or any other processing to, for example, prepare the decoded picture data 31 for display by, for example, the display device 34.

The display device 34 of the destination device 14 is configured to receive the post-processed picture data 33 to display a picture, for example, to a user or a viewer. The display device 34 may be or include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or the corresponding functionality and the destination device 14 or the corresponding functionality. In such an embodiment, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) division of function-alities of different units or the functionalities of the source device 12 and/or the destination device 14 shown in FIG. 1 may vary depending on an actual device and application.

The encoder 20 (for example, the video encoder 20) and the decoder 30 (for example, the video decoder 30) each may be implemented as any one of various suitable circuits, for example, one or more microprocessors, digital signal processors (DSP), application-specific integrated circuits (ASIC), field-programmable gate arrays (FPGA), discrete logic, hardware, or any combinations thereof. If the tech-nologies are implemented partially by using software, a device may store software instructions in an appropriate and non-transitory computer-readable storage medium and may execute instructions by using hardware such as one or more processors, to perform the technologies of this disclosure. Any of the foregoing content (including hardware, software, a combination of hardware and software, and the like) may be considered as one or more processors. The video encoder 20 and the video decoder 30 each may be included in one or more encoders or decoders, and the encoder or the decoder may be integrated as a part of a combined encoder/decoder (codec) in a corresponding device.

The source device 12 may be referred to as a video encoding device or a video encoding apparatus. The desti-nation device 14 may be referred to as a video decoding device or a video decoding apparatus. The source device 12 and the destination device 14 may be an example of a video coding device or a video coding apparatus.

The source device 12 and the destination device 14 may include any one of a wide range of devices, including any type of handheld or stationary device, for example, a note-book or laptop computer, a mobile phone, a smartphone, a tablet or tablet computer, a video camera, a desktop com-puter, a set-top box, a television, a display device, a digital media player, a video game console, a video streaming device (such as a content service server or a content delivery server), a broadcast receiver device, or a broadcast trans-mitter device, and may use or not use any type of operating system.

In some cases, the source device 12 and the destination device 14 may be equipped for wireless communication. Therefore, the source device 12 and the destination device 14 may be wireless communications devices.

In some cases, the video coding system 10 shown in FIG. 1 is merely an example, and the technologies of this appli-cation is applicable to video coding settings (for example, video encoding or video decoding) that do not necessarily include any data communication between an encoding device and a decoding device. In other examples, data may be retrieved from a local memory, streamed over a network, or the like. A video encoding device may encode and store data to the memory, and/or a video decoding device may retrieve and decode data from the memory. In some examples, the encoding and the decoding are performed by devices that do not communicate with one another, but simply encode data to the memory and/or retrieve and decode data from the memory.

It should be understood that for each of the examples described with reference to the video encoder 20, the video decoder 30 may be configured to perform a reverse process. With regard to a signaling syntax element, the video decoder 30 may be configured to receive and parse such a syntax element and correspondingly decode related video data. In some examples, the encoder 20 may entropy encode the syntax element into an encoded video bitstream. In such examples, the video decoder 30 may parse such syntax element and correspondingly decode related video data.

Figure 2:
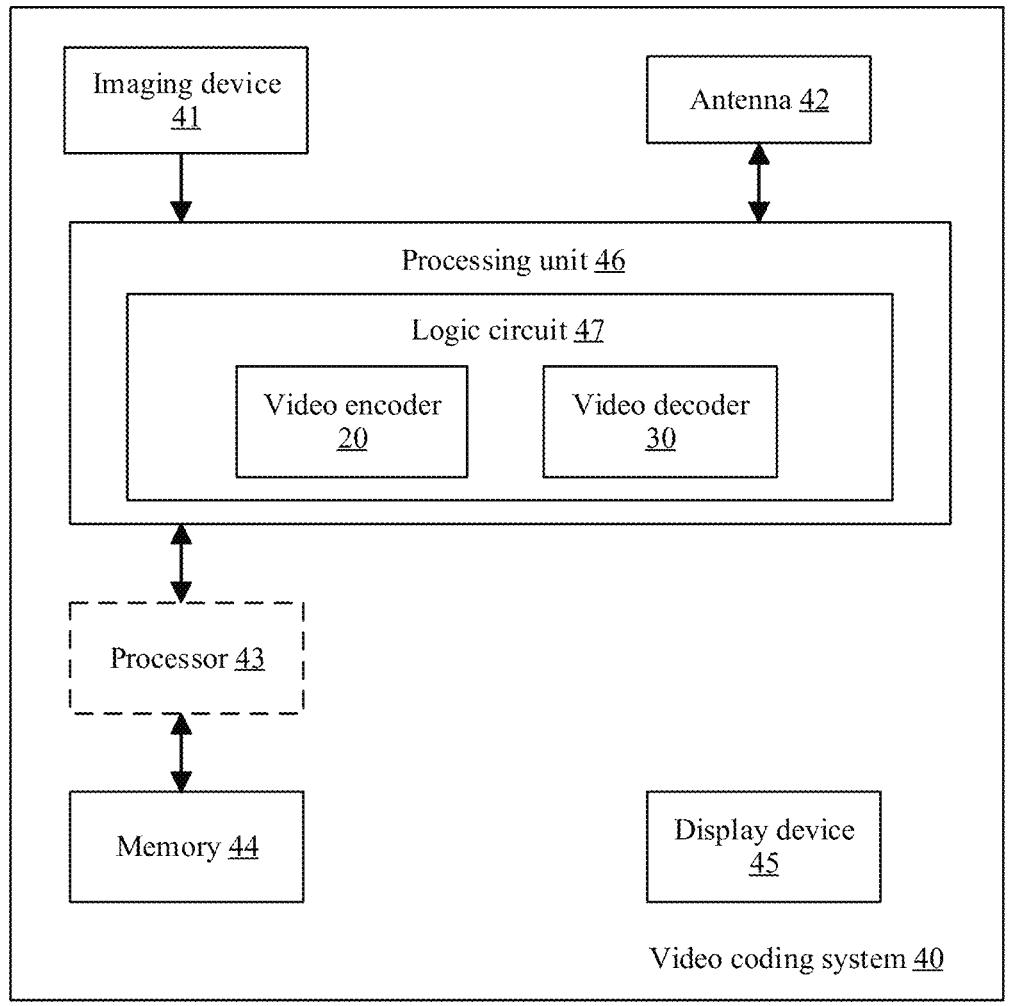
FIG. 2 is a block diagram of an example of a video coding system including any one or two of an encoder 20 in FIG. 3 and a decoder 30 in FIG. 4.
Figure 3:
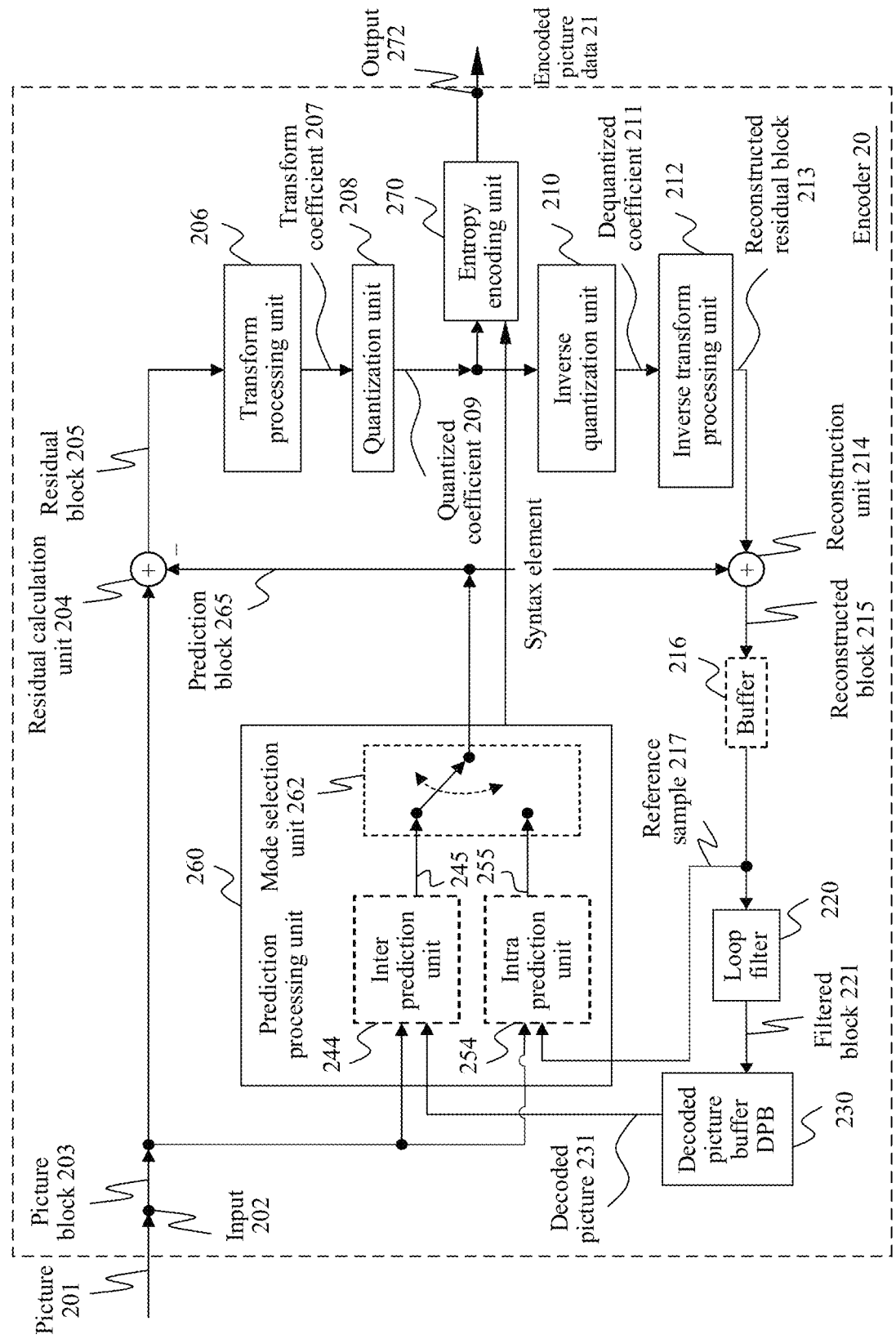
FIG. 3 is a block diagram showing an example structure of a video encoder used to implement an embodiment of this application.
Figure 4:
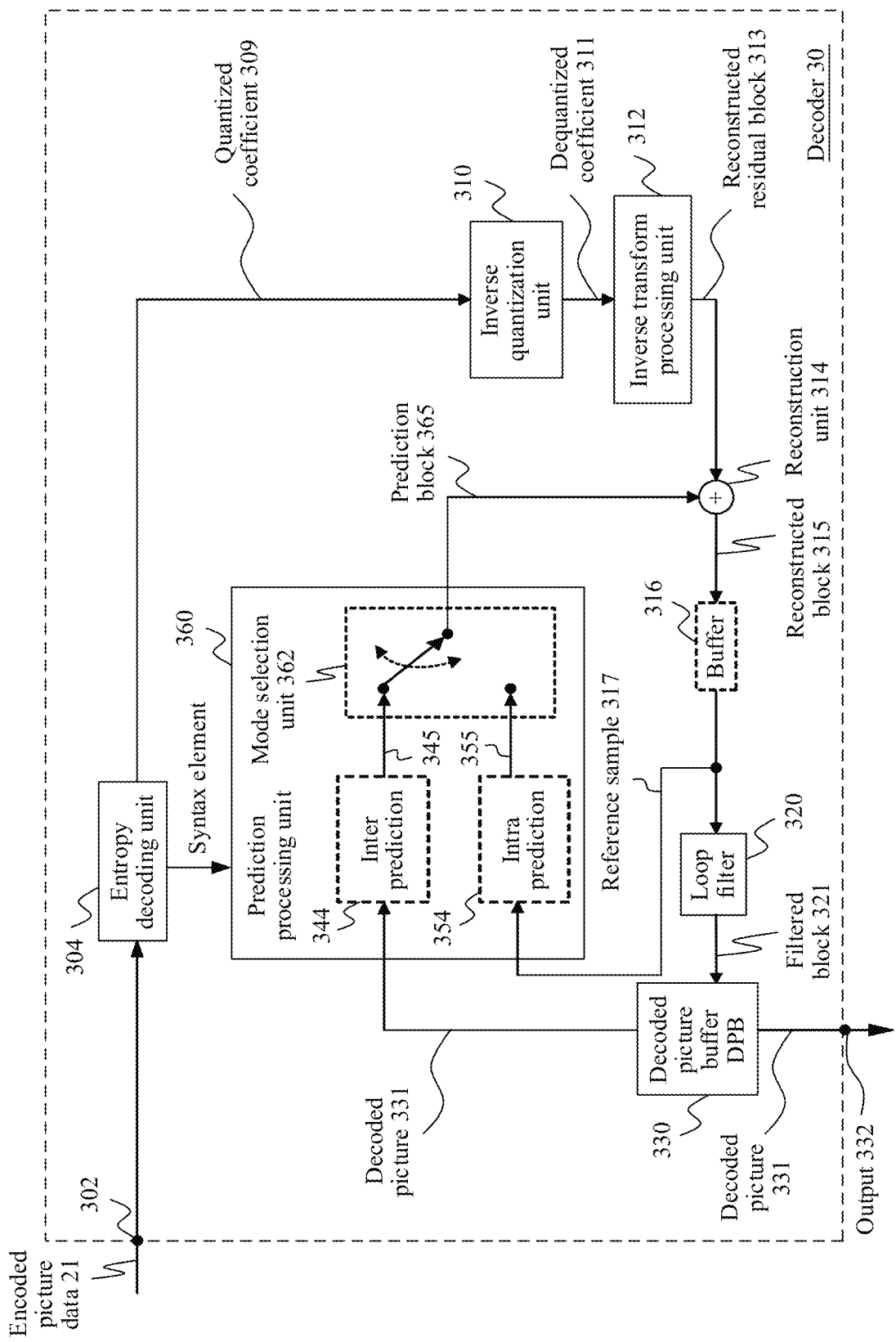
FIG. 4 is a block diagram showing an example structure of a video decoder used to implement an embodiment of this application.

FIG. 2 is an illustration diagram of an example of a video coding system 40 including the encoder 20 in FIG. 3 and/or the decoder 30 in FIG. 4 according to an example embodi-ment. The system 40 may implement a combination of various technologies of this application. In a described implementation, the video coding system 40 may include an imaging device 41, the video encoder 20, the video decoder 30 (and/or a video encoder implemented by using a logic circuit 47 of a processing unit 46), an antenna 42, one or more processors 43, one or more memories 44, and/or a display device 45.

As shown in FIG. 2, the imaging device 41, the antenna 42, the processing unit 46, the logic circuit 47, the video encoder 20, the video decoder 30, the processor 43, the memory 44, and/or the display device 45 can communicate with each other. As described, although the video coding system 40 is illustrated by using the video encoder 20 and the video decoder 30, in another different example, the video coding system 40 may include only the video encoder 20 or only the video decoder 30.

In some examples, as shown in FIG. 2, the video coding system 40 may include the antenna 42. For example, the antenna 42 may be configured to transmit or receive encoded bitstreams of video data. In addition, in some examples, the video coding system 40 may include the display device 45. The display device 45 may be configured to present the video data. In some examples, as shown in FIG. 2, the logic circuit 47 may be implemented by the processing unit 46. The processing unit 46 may include application-specific integrated circuit (ASIC) logic, a graphics processor, a general-purpose processor, or the like. The video coding system 40 may further include an optional processor 43. The optional processor 43 may similarly include application-specific integrated circuit (ASIC) logic, a graphics processor, a general-purpose processor, or the like. In some examples, the logic circuit 47 may be implemented by hardware, for example, dedicated hardware for video coding. The processor 43 may be implemented by general-purpose software, an operating system, or the like. In addition, the memory 44 may be any type of memory, for example, a volatile memory (for example, a static random access memory (SRAM) or a dynamic random access memory (DRAM)), or a nonvolatile memory (for example, a flash memory). In a non-limitative example, the memory 44 may be implemented as a cache memory. In some examples, the logic circuit 47 may access the memory 44 (for example, for implementation of a picture buffer). In another example, the logic circuit 47 and/or the processing unit 46 may include a memory (for example, a cache) for implementation of a picture buffer or the like.

In some examples, the video encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the video encoder 20 implemented by using the logic circuit 47, to implement various modules described with reference to FIG. 2 and/or any other encoder system or subsystem described in this specification. The logic circuit may be configured to perform various operations described in this specification.

The video decoder 30 may be implemented by the logic circuit 47 in a similar manner, to implement various modules described with reference to the decoder 30 in FIG. 4 and/or any other decoder system or subsystem described in this specification. In some examples, the video decoder 30 implemented by using the logic circuit may include a picture buffer (which is implemented by the processing unit 2820 or the memory 44) and a graphics processing unit (which is implemented by, for example, the processing unit 46). The graphics processing unit may be communicatively coupled to the picture buffer. The graphics processing unit may include the video decoder 30 implemented by using the logic circuit 47, to implement various modules described with reference to FIG. 4 and/or any other decoder system or subsystem described in this specification.

In some examples, the antenna 42 of the video coding system 40 may be configured to receive the encoded bitstream of the video data. As described, the encoded bitstream may include data, an indicator, an index value, mode selection data, or the like that is related to video frame coding and that is described in this specification, for example, data related to coding partitioning (for example, a transform coefficient or a quantized transform coefficient, an optional indicator (as described), and/or data defining the coding partitioning). The video coding system 40 may further include the video decoder 30 that is coupled to the antenna 42 and that is configured to decode the encoded bitstream. The display device 45 is configured to present a video frame.

Encoder & Encoding Method

FIG. 3 is a schematic/conceptual block diagram of an example of a video encoder 20 configured to implement the technologies of this application (this disclosure). In the example of FIG. 3, the video encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The video encoder 20 shown in FIG. 3 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to the decoder 30 in FIG. 4).

The encoder 20 receives, for example, through an input 202, a picture 201 or a block 203 of the picture 201, for example, a picture in a sequence of pictures forming a video or a video sequence. The picture block 203 may also be referred to as a current picture block or a to-be-encoded picture block. The picture 201 may be referred to as a current picture or a to-be-encoded picture (particularly in video coding, to distinguish the current picture from other pictures, the other pictures are, for example, previously encoded and/or decoded pictures in a same video sequence, that is, the video sequence that also includes the current picture).

Partitioning

An embodiment of the encoder 20 may include a partitioning unit (not shown in FIG. 3), configured to partition the picture 201 into a plurality of blocks such as the block 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the video encoder 20 may be configured to perform any combination of the partitioning technologies described above.

Like the picture 201, the block 203 is also or may be considered as a two-dimensional array or matrix of samples with luma values (sample values), although a size of the block 203 is smaller than a size of the picture 201. In other words, the block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the block 203 defines a size of the block 203.

The encoder 20 shown in FIG. 3 is configured to encode the picture 201 block by block, for example, perform encoding and prediction on each block 203.

Residual Calculation

The residual calculation unit 204 is configured to calculate a residual block 205 based on the picture block 203 and a prediction block 265 (details about the prediction block 265 are further provided below), for example, by subtracting sample values of the prediction block 265 from sample values of the picture block 203 sample by sample, to obtain the residual block 205 in a sample domain.

Transform

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. In comparison with an orthogonal DCT transform, such an integer approximation is typically scaled by a factor. To preserve a norm of a residual block which is processed by using forward and inverse transforms, applying an additional scale factor is a part of a transform process. The scale factor is usually chosen based on some constraints. For example, the scale factor is a power of two for a shift operation, a bit depth of the transform coefficient, or a tradeoff between accuracy and implementation costs. For example, a specific scale factor is specified for the inverse transform by, for example, the inverse transform processing unit 212 at a decoder 30 side (and a corresponding inverse transform by, for example, the inverse transform processing unit 212 at an encoder 20 side), and correspondingly, a corresponding scale factor may be specified for the forward transform by the transform processing unit 206 at the encoder 20 side.

Quantization

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An appropriate quantization step may be indicated by the quantization parameter (QP). For example, the quantization parameter may be an index to a predefined set of appropriate quantization steps. For example, a smaller quantization parameter may correspond to finer quantization (a smaller quantization step) and a larger quantization parameter may correspond to coarser quantization (a larger quantization step) or vice versa. The quantization may include division by a quantization step and corresponding quantization or inverse quantization, for example, performed by the inverse quantization unit 210, or may include multiplication by a quantization step. In embodiments according to some standards such as the HEVC, a quantization parameter may be used to determine the quantization step. Generally, the quantization step may be calculated based on a quantization parameter using a fixed point approximation of an equation including division. An additional scaling factor may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization step.

The inverse quantization unit 210 is configured to apply the inverse quantization of the quantization unit 208 to a quantized coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (, DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, the reconstructed residual block 213) to the prediction block 265, for example, by adding sample values of the reconstructed residual block 213 and the sample values of the prediction block 265, to obtain a reconstructed block 215 in the sample domain.

In an embodiment, a buffer unit 216 ("buffer" 216 for short) of, for example, the line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, in an embodiment, the encoder 20 may be configured so that the buffer unit 216 is configured to store the reconstructed block 215 not only used for intra prediction 254 but also used for the loop filter unit 220 (not shown in FIG. 3), and/or so that, for example, the buffer unit 216 and the decoded picture buffer 230 form one buffer. In other embodiments, a filtered block 221 and/or a block or a sample from the decoded picture buffer 230 (the block or sample is not shown in FIG. 3) are/is used as an input or a basis for the intra prediction unit 254.

The loop filter unit 220 ("loop filter" 220 for short) is configured to filter the reconstructed block 215 to obtain a filtered block 221, to smooth sample transitions or improve video quality. The loop filter unit 220 is intended to represent one or more loop filters including, for example, a deblocking filter, a sample-adaptive offset (sample-adaptive offset, SAO) filter, and another filter such as a bilateral filter, an adaptive loop filter (adaptive loop filter, ALF), a sharpening or smoothing filter, or a collaborative filter. Although the loop filter unit 220 is shown in FIG. 3 as an in-loop filter, in other configurations, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that, for example, the decoder 30 can receive and apply the same loop filter parameter for decoding.

The decoded picture buffer (DPB) 230 may be a reference picture memory that stores reference picture data for use in video data encoding by the video encoder 20. The DPB 230 may be formed by any one of a variety of memory devices such as a dynamic random access memory (DRAM) (including a synchronous DRAM (SDRAM), a magnetoresistive RAM (MRAM), a resistive RAM (RRAM)), or another type of memory device. The DPB 230 and the buffer 216 may be provided by a same memory device or separate memory devices. In an example, the decoded picture buffer (DPB) 230 is configured to store the filtered block 221. The decoded picture buffer 230 may further be configured to store another previously filtered block, for example, a previously reconstructed and filtered block 221, of the same current picture or of a different picture, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (decoded picture buffer, DPB) 230 is configured to store the reconstructed block 215.

The prediction processing unit 260, also referred to as a block prediction processing unit 260, is configured to receive or obtain the block 203 (a current block 203 of the current picture 201) and reconstructed picture data, for example, reference samples of the same (current) picture from the buffer 216 and/or reference picture data 231 of one or more previously decoded pictures from the decoded picture buffer 230, and process such data for prediction, to be specific, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (rate distortion optimization, RDO), to be specific, select a prediction mode that provides minimum rate-distortion optimization or select a prediction mode for which related rate distortion at least satisfies a prediction mode selection criterion.

The following describes in detail prediction processing performed (for example, by the prediction processing unit 260) and mode selection performed (for example, by the mode selection unit 262) by an example of the encoder 20.

As described above, the encoder 20 is configured to determine or select an optimal or optimum prediction mode from a set of (pre-determined) prediction modes. The set of prediction modes may include, for example, an intra prediction mode and/or an inter prediction mode.

A set of intra prediction modes may include 35 different intra prediction modes, may include 67 different intra prediction modes, or may include an intra prediction mode defined in H.266 under development.

A set of inter prediction modes depends on available reference pictures (namely, for example, at least some decoded pictures stored in the DBP 230, as described above) and other inter prediction parameters, for example, depends on whether an entire reference picture or only a part of the reference picture, for example, a search window region around a region of the current picture block, is used to search for a best matching reference block, and/or for example, depends on whether sample interpolation such as half-pel and/or quarter-pel interpolation is applied.

In addition to the foregoing prediction modes, a skip mode and/or a direct mode may also be applied.

The prediction processing unit 260 may further be configured to partition the block 203 into smaller block partitions or subblocks, for example, by iteratively using quadtree (quad-tree, QT) partitioning, binary tree (binary-tree, BT) partitioning, triple tree (triple-tree, TT) partitioning, or any combination thereof, and perform, for example, prediction on each of the block partitions or subblocks. Mode selection includes selection of a tree structure of the partitioned block 203 and selection of a prediction mode used for each of the block partitions or subblocks.

The inter prediction unit 244 may include a motion estimation (motion estimation, ME) unit (not shown in FIG. 3) and a motion compensation (motion compensation, MC) unit (not shown in FIG. 3). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and a previously decoded picture 31, or in other words, the current picture and the previously decoded picture 31 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 3), a reference picture and/or provide an offset (a spatial offset) between a location (coordinates X and Y) of the reference block and a location of the current block as an inter prediction parameter. This offset is also referred to as a motion vector (motion vector, MV).

The motion compensation unit is configured to obtain, for example, receive the inter prediction parameter, and perform inter prediction based on or by using the inter prediction parameter, to obtain the inter prediction block 245. Motion compensation performed by the motion compensation unit (not shown in FIG. 3) may include extracting or generating a prediction block based on a motion/block vector determined through motion estimation (interpolation may be performed at a sub-sample precision). Interpolation filtering may generate additional sample samples from known sample samples, thereby potentially increasing a quantity of candidate prediction blocks that may be used to code a picture block. Upon receiving a motion vector for a PU of the current picture block, a motion compensation unit 246 may locate a prediction block to which the motion vector points in one of the reference picture lists. The motion compensation unit 246 may also generate a syntax element associated with a block and a video slice, so that the video decoder 30 uses the syntax element to decode the picture block of the video slice.

The intra prediction unit 254 is configured to obtain, for example, receive, a picture block 203 (the current picture block) and one or more previously reconstructed blocks, for example, reconstructed neighboring blocks, of a same picture for intra estimation. For example, the encoder 20 may be configured to select an intra prediction mode from a plurality of intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra-prediction mode for a block, the intra prediction unit 254 is further configured to provide an intra prediction parameter, namely, information indicating the selected intra-prediction mode for the block, to the entropy encoding unit 270. In an example, the intra prediction unit 254 may be configured to perform any combination of intra prediction technologies described below.

The entropy encoding unit 270 is configured to apply (or avoid applying) an entropy encoding algorithm or scheme (for example, a variable length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy coding methodology or technique) to one or all of the following: the quantized coefficient 209, the inter prediction parameter, the intra prediction parameter, and/or the loop filter parameter, to obtain the encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may further be configured to entropy encode another syntax element for a current video slice that is being encoded.

Another structural variant of the video encoder 20 can be used to encode a video stream. For example, a non-transform based encoder 20 may directly quantize a residual signal without the transform processing unit 206 for some blocks or frames. In another implementation, the encoder 20 may have the quantization unit 208 and the inverse quantization unit 210 that are combined into a single unit.

FIG. 4 shows an example video decoder 30, configured to implement the technologies of this application. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and an associated syntax element.

In the example of FIG. 4, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process generally reciprocal to the encoding process described with reference to the video encoder 20 in FIG. 3.

The entropy decoding unit 304 is configured to perform entropy decoding on the encoded picture data 21 to obtain, for example, a quantized coefficient 309 and/or a decoded encoding parameter (not shown in FIG. 4), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may be similar to the inter prediction unit 244 in functions, and the intra prediction unit 354 may be similar to the intra prediction unit 254 in functions. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 for a picture block of the current video slice based on a signaled intra-prediction mode and data that is from a previously decoded block of a current frame or picture. When a video frame is encoded as an inter-encoded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one of reference pictures in one reference picture list. The video decoder 30 may construct reference frame lists, a list 0 and a list 1, by using a default construction technology and based on reference pictures stored in the DPB 330.

The prediction processing unit 360 is configured to determine prediction information for the video block of the current video slice by parsing the motion vector and the another syntax element, and use the prediction information to generate a prediction block for the current video block that is being decoded. For example, the prediction processing unit 360 determines, by using some received syntax elements, a prediction mode (for example, intra or inter prediction) for encoding the video block in the video slice, an inter prediction slice type (for example, a B slice, a P slice, or a GPB slice), construction information of one or more of reference picture lists for the slice, a motion vector of each inter encoded video block for the slice, an inter prediction status of each inter encoded video block in the slice, and other information, to decode the video block in the current video slice.

The inverse quantization unit 310 may be configured to perform inverse quantization (namely, dequantization) on a quantized transform coefficient provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a sample domain.

The reconstruction unit 314 (for example, the summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (during a coding loop or after a coding loop) is configured to filter the reconstructed block 315 to obtain a filtered block 321, to smooth sample transition or improve video quality. In an example, the loop filter unit 320 may be configured to perform any combination of filtering technologies described below. The loop filter unit 320 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 320 is shown as an in-loop filter in FIG. 4, in another configuration, the loop filter unit 320 may be implemented as a post-loop filter.

The decoded video block 321 in a given frame or picture is then stored in the decoded picture buffer 330 that stores a reference picture used for subsequent motion compensation.

The decoder 30 is configured to, for example, output a decoded picture 31 through an output 332, for presentation to a user or viewing by a user.

Another variant of the video decoder 30 may be used to decode a compressed bitstream. For example, the decoder 30 may generate an output video stream without the loop filter unit 320. For example, a non-transform based decoder 30 may directly inverse-quantize a residual signal without the inverse transform processing unit 312 for some blocks or frames. In another implementation, the video decoder 30 may have the inverse quantization unit 310 and the inverse transform processing unit 312 combined into a single unit.

Figure 5:
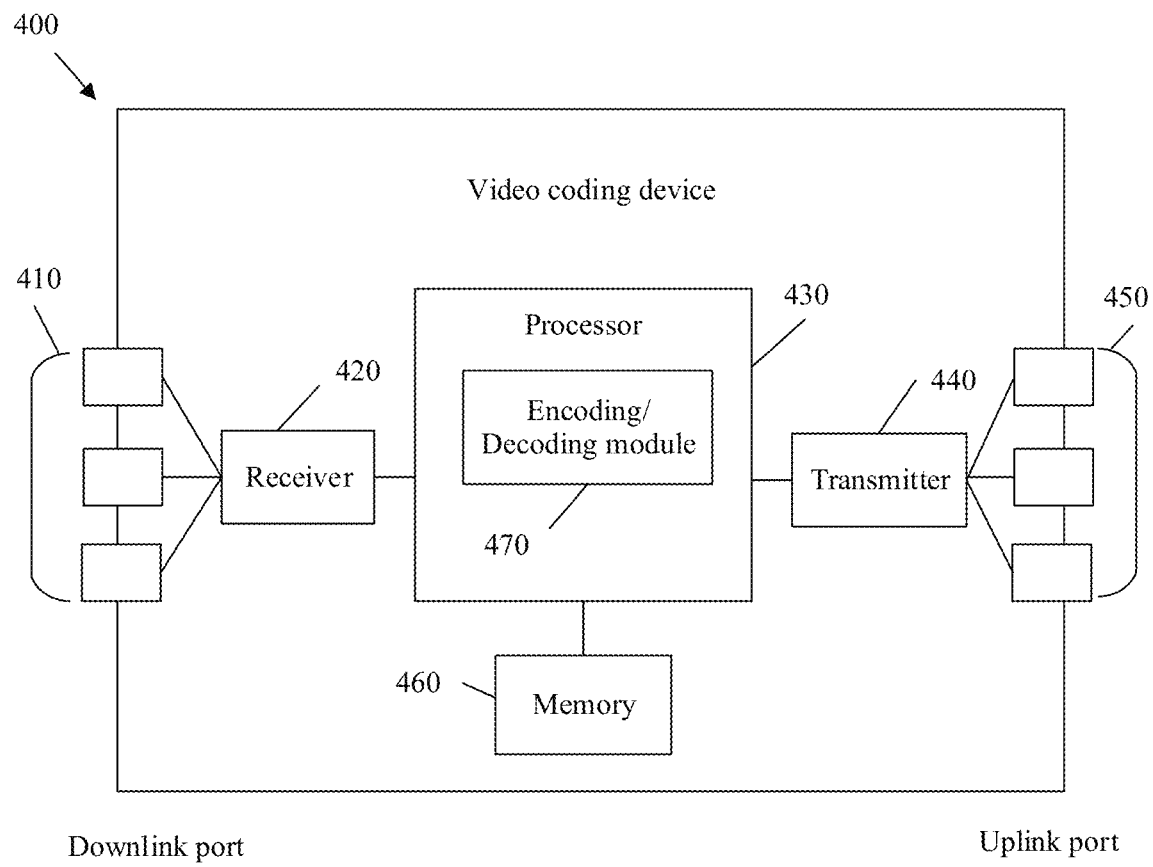
FIG. 5 is a block diagram illustrating an example of an encoding apparatus or a decoding apparatus.

FIG. 5 is a schematic diagram of a structure of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the video decoder 30 in FIG. 1) or a video encoder (for example, the video encoder 20 in FIG. 1). In another embodiment, the video coding device 400 may be one or more components in the video decoder 30 in FIG. 1 or the video encoder 20 in FIG. 1.

The video coding device 400 includes: an ingress port 410 and a receiving unit (Rx) 420 for receiving data; a processor, a logic unit, or a central processing unit (CPU) 430 for processing data; a transmitter unit (Tx) 440 and an egress port 450 for transmitting data; and a memory 460 for storing data. The video coding device 400 may further include an optical-to-electrical conversion component and an electrical-to-optical (EO) component coupled to the ingress port 410, the receiver unit 420, the transmitter unit 440, and the egress port 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the foregoing disclosed embodiments. For example, the encoding/decoding module 470 implements, processes, or provides various coding operations. Therefore, the encoding/decoding module 470 substantially improves functions of the video coding device 400 and affects transform of the video coding device 400 to a different state. Alternatively, the encoding/decoding module 470 is implemented as an instruction stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a read-only memory (ROM), a random access memory (RAM), a ternary content-addressable memory (TCAM), and/or a static random access memory (SRAM).

Figure 6:
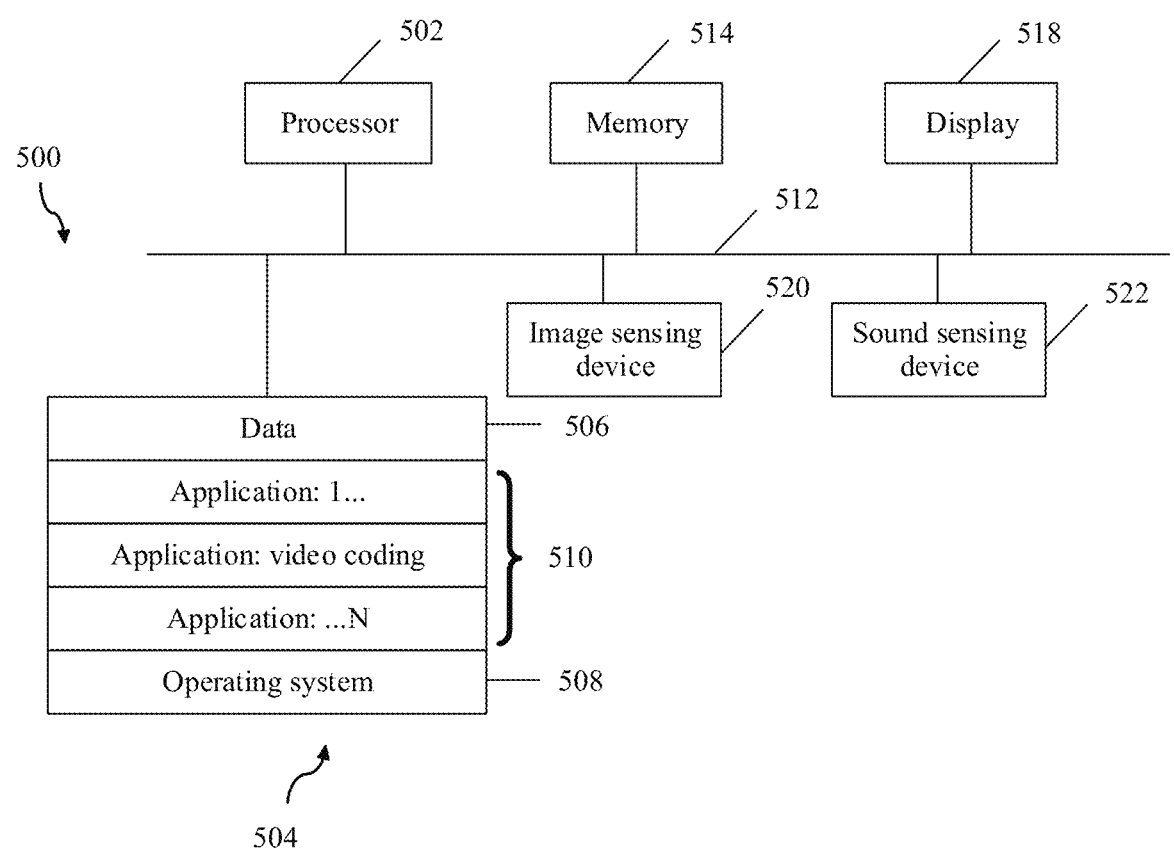
FIG. 6 is a block diagram illustrating an example of another encoding apparatus or another decoding apparatus.

FIG. 6 is a simplified block diagram of an apparatus 500 that may be used as either or two of the source device 12 and the destination device 14 in FIG. 1 according to an example embodiment. The apparatus 500 may implement the technologies in this application. The apparatus 500 configured to implement chroma block prediction may be in a form of a computing system including a plurality of computing devices, or may be in a form of a single computing device such as a mobile phone, a tablet computer, a laptop computer, a notebook computer, or a desktop computer.

A processor 502 in the apparatus 500 may be a central processing unit. Alternatively, the processor 502 may be any other type of device or a plurality of devices, capable of manipulating or processing information existing or to be developed in the future. As shown in FIG. 6, although the disclosed implementations may be practiced by using a single processor such as the processor 502, advantages in speed and efficiency may be achieved by using more than one processor.

In an implementation, a memory 504 in the apparatus 500 may be a read-only memory (ROM) device or a random access memory (RAM) device. Any other suitable type of storage device may be used as the memory 504. The memory 504 may include code and data 506 that is accessed by the processor 502 through a bus 512. The memory 504 may further include an operating system 508 and an application program 510. The application program 510 includes at least one program that allows the processor 502 to perform the method described in this specification. For example, the application program 510 may include applications 1 to N, and the applications 1 to N further include a video coding application that performs the method described in this specification. The apparatus 500 may further include an additional memory in a form of a secondary memory 514. The secondary memory 514 may be, for example, a memory card used with a mobile computing device. Because a video communication session may include a large amount of information, the information may be fully or partially stored in the secondary memory 514 and loaded into the memory 504 for processing as required.

The apparatus 500 may further include one or more output devices, for example, a display 518. In an example, the display 518 may be a touch sensitive display that combines a display with a touch sensitive element that is operable to sense a touch input. The display 518 may be coupled to the processor 502 through the bus 512. In addition to the display 518, another output device that allows a user to program the apparatus 500 or otherwise use the apparatus 500 may further be provided, or another output device may be provided as an alternative to the display 518. When the output device is or includes a display, the display may be implemented in various ways, including by using a liquid crystal display (LCD), a cathode-ray tube (CRT) display, a plasma display, or a light emitting diode (LED) display such as an organic LED (OLED) display.

The apparatus 500 may further include or be connected to an image sensing device 520. The image sensing device 520 is, for example, a camera or any other image sensing device 520 that can sense a picture and that is existing or to be developed in the future. The picture is, for example, a picture of a user that runs the apparatus 500. The image sensing device 520 may be placed directly facing the user that runs the apparatus 500. In an example, a location and an optical axis of the image sensing device 520 may be configured, so that a field of view of the image sensing device 520 includes a region neighboring to the display 518 and the display 518 can be seen from the region.

The apparatus 500 may further include or be connected to a sound sensing device 522. The sound sensing device 522 is, for example, a microphone or any other sound sensing device that can sense a sound near the apparatus 500 and that is existing or to be developed in the future. The sound sensing device 522 may be placed directly facing the user operating the apparatus 500, and may be configured to receive a sound, for example, a voice or another sound, made by the user when the user runs the apparatus 500.

Although the processor 502 and the memory 504 of the apparatus 500 are depicted in FIG. 6 as being integrated into a single unit, another configuration may still be used. Running of the processor 502 may be distributed in a plurality of machines (each machine has one or more processors) that can be directly coupled, or distributed in a local region or another network. The memory 504 may be distributed in a plurality of machines. For example, the memory 504 is a network-based memory or memories in a plurality of machines that run the apparatus 500. Although depicted as a single bus herein, the bus 512 of the apparatus 500 may be formed by a plurality of buses. Further, the secondary memory 514 may be directly coupled to another component of the apparatus 500 or may be accessed through a network. In addition, the secondary memory 514 may include a single integrated unit, for example, one memory card, or a plurality of units, for example, a plurality of memory cards. Therefore, the apparatus 500 may be implemented in a wide variety of configurations.

Figure 7:
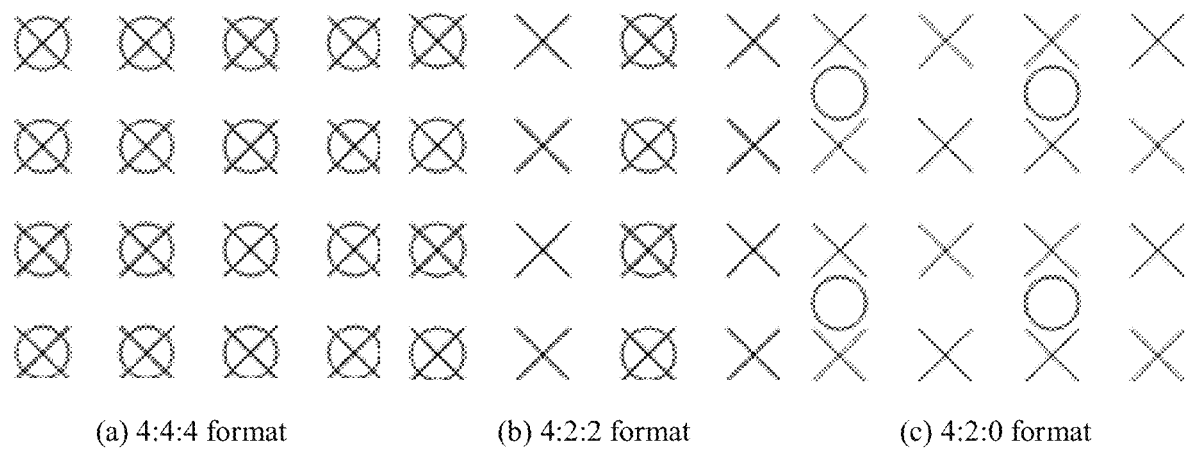
FIG. 7 illustrates an example of a sampling grid in a YUV format.

As described above in this application, a color video further includes a chroma component (U, V) in addition to a luma (Y) component. Therefore, the luma component needs to be encoded, and the chroma component also needs to be encoded. According to different sampling methods of the luma component and the chroma component in the color video, there are generally YUV 4:4:4, YUV 4:2:2, and YUV 4:2:0. As shown in FIG. 7, a cross represents a luma component sampling point, and a circle represents a chroma component sampling point.

In a 4:4:4 format, a chroma component is not down-sampled.

In a 4:2:2 format, 2:1 horizontal downsampling is performed on a chroma component relative to a luma component, and no vertical downsampling is performed. For every two U sampling points or V sampling points, each row includes four Y sampling points.

In a 4:2:0 format, 2:1 horizontal downsampling is performed on a chroma component relative to a luma component, and 2:1 vertical downsampling is performed on the chroma component relative to the luma component.

YUV 4:2:0 is most common. When a video picture uses the YUV 4:2:0 sampling format, if a luma component of a picture block is a 2M×2N picture block, a chroma component of the picture block is an M×N picture block. Therefore, the chroma component of the picture block is also referred to as a chroma block or a chroma component block in this application. This application is described by using YUV 4:2:0 as an example, but another sampling method for a luma component and a chroma component is also applicable to this application.

In this application, a pixel in a chroma picture is referred to as a chroma sample or a chroma point for short. A pixel in a luma picture is referred to as a luma sample or a luma point for short.

Similar to the luma component, in chroma intra prediction, boundary samples of a neighboring reconstructed block around a current chroma block are also used as reference samples of a current block. The reference samples are mapped to samples in the current chroma block according to a specific prediction mode, and are used as a prediction value of the samples in the current chroma block. A difference lies in that, because texture of the chroma component is usually relatively simple, a quantity of intra prediction modes for the chroma component is usually less than a quantity of intra prediction modes for the luma component.

A cross-component prediction mode (CCP) is also referred to as a cross-component intra prediction mode (CCIP) or a cross component linear model (CCLM) prediction mode. The CCLM prediction mode may also be referred to as a linear model (LM) mode for short. The LM mode (short for the linear model or a linear mode) is a chroma intra prediction method that uses texture correlation between luma and chroma. LM uses a reconstructed luma component to derive a prediction value of a current chroma block according to the linear model, and may use the following equation:

$$\text{pred}_C(i,j) = \alpha * \text{rec}'_L(i,j) + \beta \quad (1)$$

where $\alpha$ and $\beta$ are both linear model coefficients, $\alpha$ is a scaling coefficient, $\beta$ is an offset factor, $\text{pred}_C(i,j)$ is a prediction value of chroma samples at a position (i,j), and $\text{rec}_L'(i,j)$ is a luma reconstruction sample value at the position (i,j) obtained after a luma reconstruction block (which is referred to as a corresponding luma block for short below) corresponding to the current chroma block is downsampled to a chroma component resolution. For a video in the YUV 4:2:0 format, a resolution of a luma component is four times a resolution of a chroma component (the width of the luma component is twice the width of the chroma component, and the height of the luma component is twice the height of the chroma component). To obtain a luma block with a same resolution as a chroma block, the luma component needs to be downsampled to a chroma resolution according to a downsampling method same as that of the chroma component, and then the luma component is used.

Figure 8:
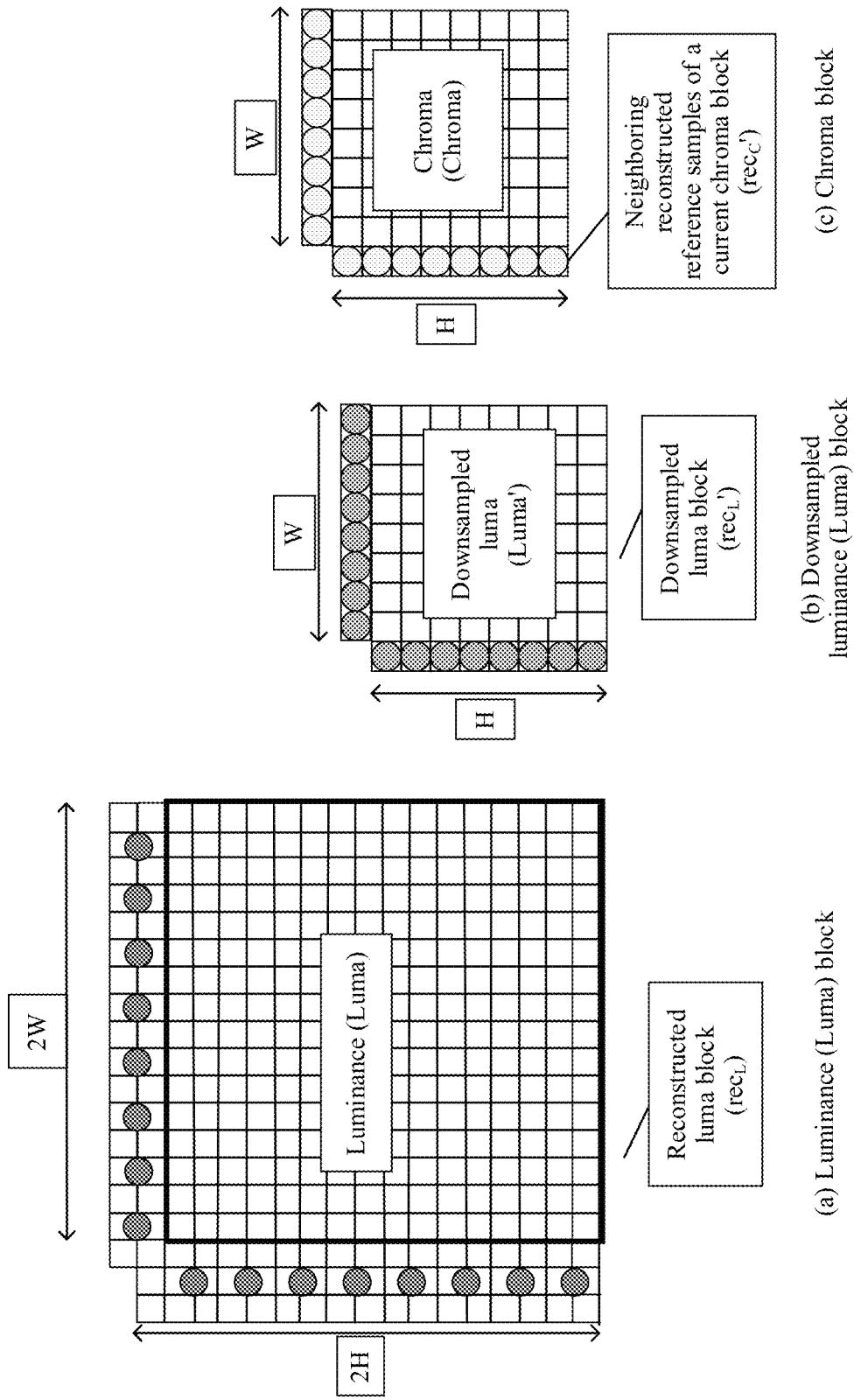
FIG. 8 illustrates an embodiment of a cross-component prediction (Cross component prediction, CCP) mode.

The linear model coefficients $\alpha$ and $\beta$ do not need to be encoded for transmission, but are derived using boundary samples of a neighboring reconstructed block of the current chroma block and luma samples at corresponding positions of the boundary samples. FIG. 8 shows an embodiment of the cross-component prediction (CCP) mode. In FIG. 8, recL is a reconstructed luma block (a current chroma block corresponds to a luma block and neighboring reference samples), recL' is a downsampled luma block, and recC' is neighboring reconstructed reference samples of the current chroma block. A size of the current chroma block is W×H, and neighboring reconstructed samples on an upper side and a left side of the current chroma block are used as reference samples. A size of a corresponding luma block is 2W×2H. The luma block and reference samples of the luma block are downsampled to a chroma resolution, to obtain sample blocks shown in FIG. 8(*b*). The neighboring reference samples in FIG. 8(*b*) and FIG. 8(*c*) form a one-to-one correspondence.

For ease of description, in this application, neighboring upper and left sides used for calculating linear model coefficients are referred to as a template. The neighboring upper side is referred to as an upper template, and the neighboring left side is referred to as a left template. A chroma sampling point in the upper template is referred to as an upper template chroma sample, and a luma sampling point in the upper template is referred to as an upper template luma sample. A left template chroma sample and a left template luma sample may be obtained through a similar method. The template luma samples one-to-one correspond to the template chroma samples, and values of the sampling points form a value pair.

Figure 9:
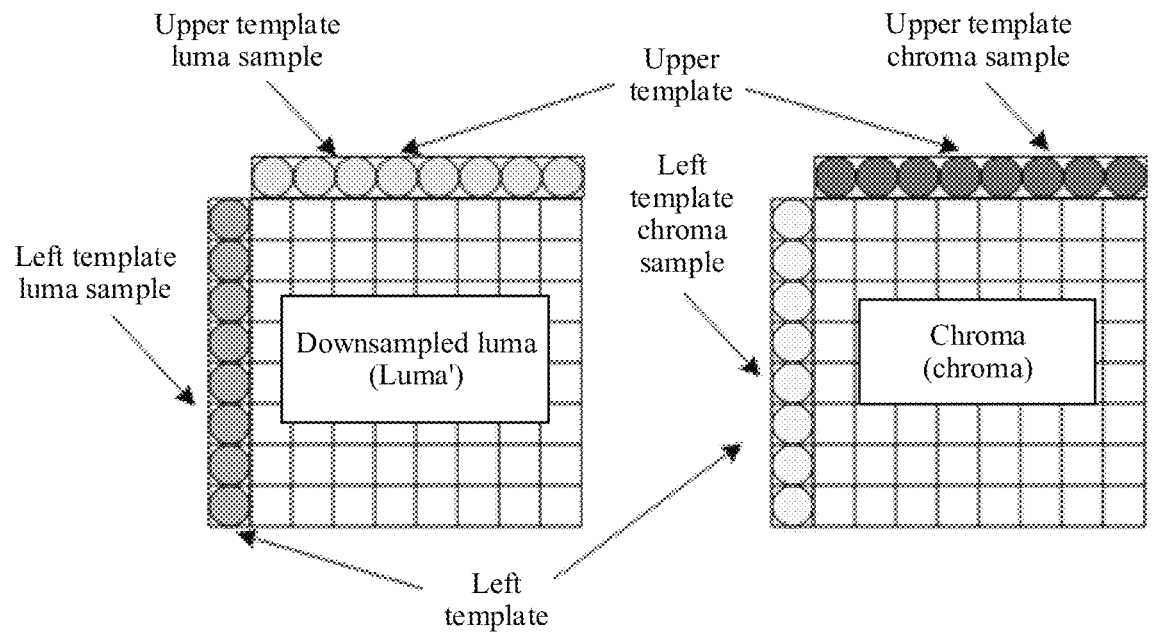
FIG. 9 is a schematic diagram of an upper template and a left template.
Figure 10:
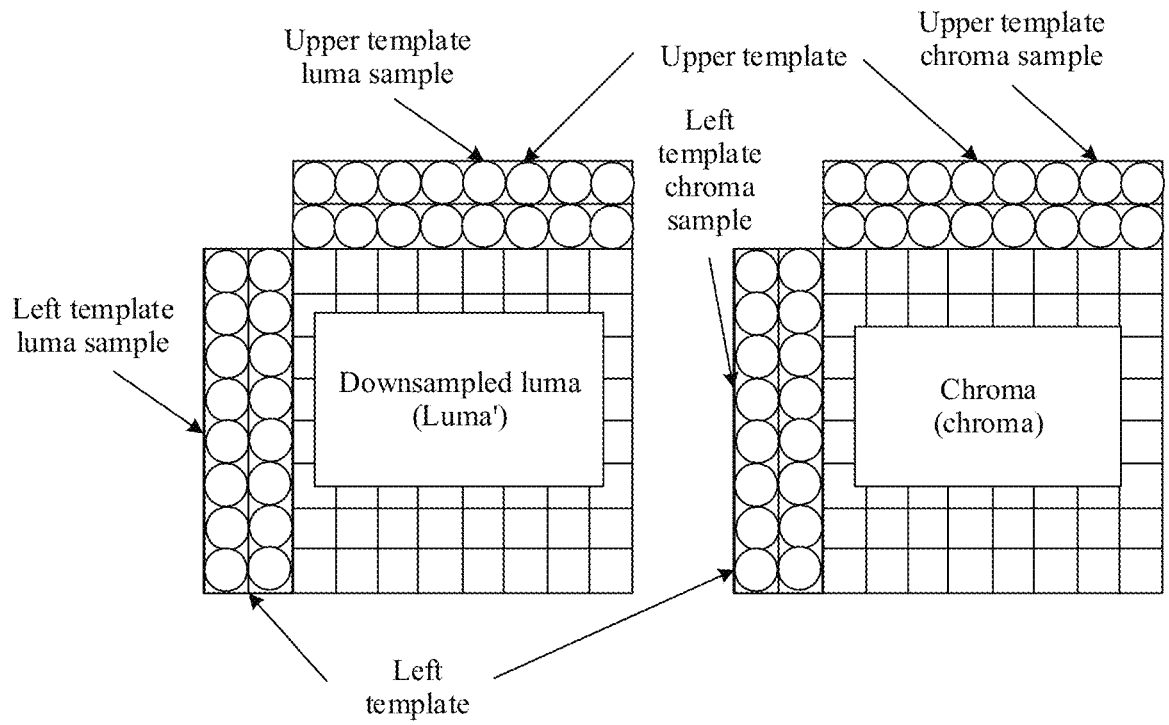
FIG. 10 is another schematic diagram of an upper template and a left template.

In this embodiment of this application, the template indicates a set of luma samples or chroma samples used for calculating the linear model coefficients. The luma samples usually need to be obtained through downsampling (because the luma component and the chroma component have different resolutions), and are denoted as luma' samples. The chroma samples are usually samples in one upper row or two upper rows, and samples in one left column or two left columns neighboring to the current chroma block. FIG. 9 is a schematic diagram of a template using one row and one column, and FIG. 10 is a schematic diagram of a template using two rows and two columns.

The LM mode can effectively use the correlation between the luma component and the chroma component. Compared with a directive prediction mode, the LM mode is more flexible, and provides a more accurate prediction signal for the chroma component.

In addition, there is also a multiple model linear model (MMLM for short) mode, and there are a plurality of $\alpha$ and $\beta$. Two linear models are used as an example. There are two sets of linear model coefficients: $\alpha_1$ and $\beta_1$, and $\alpha_2$ and $\beta_2$.

Figure 11:
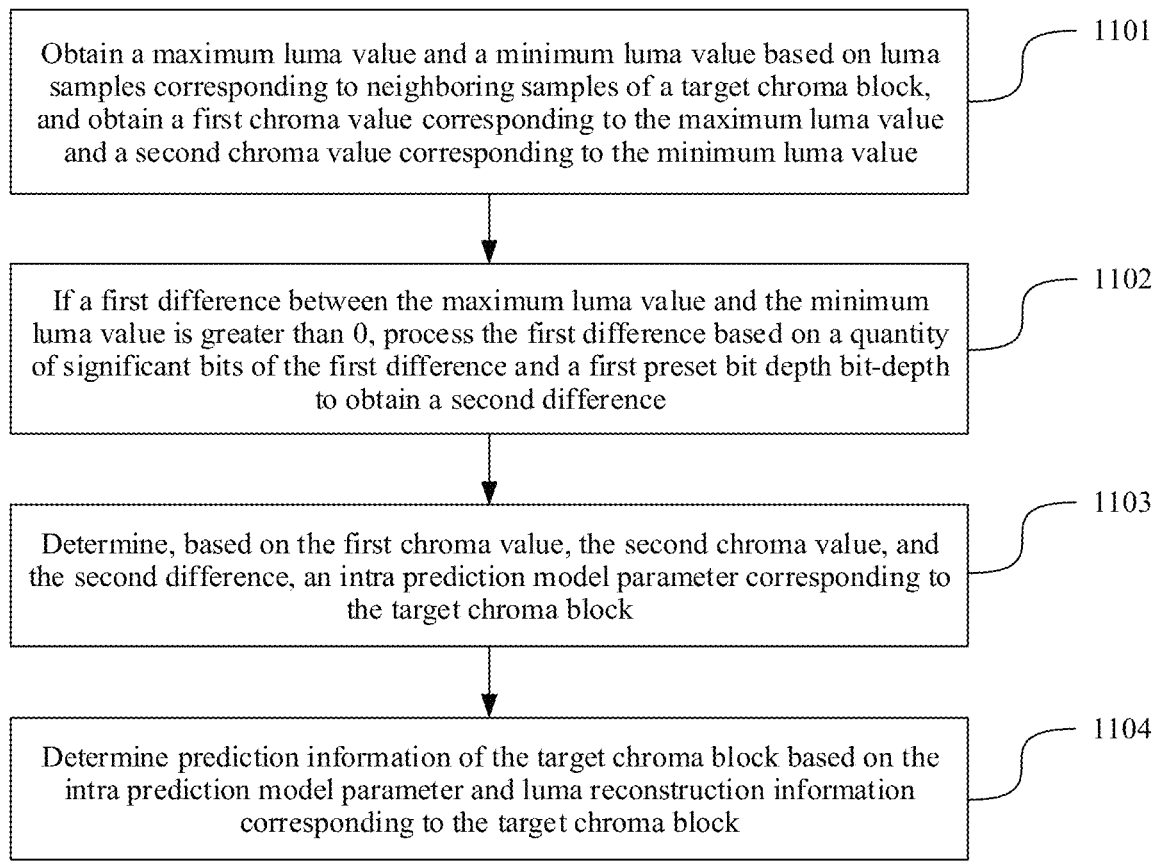
FIG. 11 is a schematic flowchart of a chroma block prediction method according to an embodiment.

An embodiment of this application provides a chroma block prediction method. This embodiment of this application illustrates an example in which intra prediction uses a CCLM. The following describes in detail a processing procedure shown in FIG. 11 with reference to a specific implementation. This process exists in both an encoding process and a decoding process, and this process may be as follows:

Operation 1101: Obtain a maximum luma value and a minimum luma value based on luma samples corresponding to neighboring samples of a target chroma block, and obtain a first chroma value corresponding to the maximum luma value and a second chroma value corresponding to the minimum luma value.

The target chroma block is any chroma block that is not encoded or decoded. The neighboring samples of the target chroma block are reference samples of a reconstructed block neighboring to the target chroma block, as shown in FIG. 9 and FIG. 10.

During implementation, when determining is performed until a current chroma block (which may be referred to as the target chroma block), a coding scheme of the target chroma block may be determined. If the coding scheme is the CCLM, the neighboring samples of the target chroma block may be determined, and the maximum luma value maxY and the minimum luma value minY are obtained based on the neighboring samples. In addition, a chroma value (namely, the first chroma value maxC) corresponding to the maximum luma value and a chroma value (namely, the second chroma value minC) corresponding to the minimum luma value may be determined.

It should be noted that, the chroma value corresponding to the maximum luma value refers to that when luma samples are the maximum luma value, chroma samples are the first chroma value, and the chroma value corresponding to the minimum luma value refers to that when luma samples are the minimum luma value, chroma samples are the second chroma value.

In an embodiment, the maximum luma value and the minimum luma value may be determined in a variety of manners. The following provides two feasible manners:

Manner 1: Obtain the maximum luma value and the minimum luma value in the luma samples corresponding to the neighboring samples of the target chroma block.

During implementation, when determining is performed until the current chroma block (which may be referred to as the target chroma block), the coding scheme of the target chroma block may be determined. If the coding scheme is the CCLM, the neighboring samples of the target chroma block may be determined, and then the maximum luma value maxY and the minimum luma value minY in the luma samples corresponding to these samples are determined.

In the manner 1, when the first chroma value and the second chroma value are determined, a chroma value of chroma samples corresponding to luma samples to which the maximum luma value belongs may be determined as the first chroma value, and a chroma value of chroma samples corresponding to luma samples to which the minimum luma value belongs may be determined as the second chroma value.

Manner 2: A preset quantity of luma samples corresponding to a preset quantity of neighboring samples of the target chroma block is divided into a first luma sample set and a second luma sample set. A quantity of luma samples in the first luma sample set is the same as a quantity of luma samples in the second luma sample set, and luma values of the luma samples in the first luma sample set are greater than or equal to luma values of the luma samples in the second luma sample set. The maximum luma value is determined based on the first luma sample set, and the minimum luma value is determined based on the second luma sample set.

During implementation, when determining is performed until the current chroma block (which may be referred to as the target chroma block), the coding scheme of the target chroma block may be determined. If the coding scheme is the CCLM, the neighboring samples of the target chroma block may be determined. Then, a preset quantity of chroma samples are selected from chroma samples of these determined samples (for example, the preset quantity is 4, and there are eight neighboring chroma samples on an upper side of the chroma block and eight neighboring chroma samples on a left side of the chroma block). There are a total of 16 chroma samples. One chroma sample may be selected from every four chroma samples (one chroma sample is selected from each of the first four chroma samples and the last four chroma samples on the upper side, and one chroma sample is selected from each of the upper four chroma samples and the lower four chroma samples on the left side), to obtain four chroma samples. Then, a target quantity of luma samples corresponding to each chroma sample in the preset quantity of chroma samples is obtained based on the preset quantity of chroma samples. Weighting processing is separately performed on luma values of the target quantity of luma samples corresponding to each chroma sample, to obtain luma values of the preset quantity of luma samples (a process of performing weighting processing on the luma values of the target quantity of luma samples to obtain luma values of the luma samples may be referred to as a down-sampling process). For example, the preset quantity of chroma samples are four chroma samples, and each chroma sample corresponds to six luma samples (for example, location coordinates of a chroma sample are (i,j), and location coordinates of the corresponding target quantity of luma samples are (2i−1, 2j−1), (2i, 2j−1), (2i+1, 2j−1), (2i−1, 2j), (2i, 2j) and (2i+1, 2j). A sum of weights respectively corresponding to the target quantity of luma samples is equal to 1. For each chroma sample, luma values of six luma samples corresponding to the chroma sample are respectively multiplied by the corresponding weights to obtain six values, and the six values are added to obtain luma values of the luma samples corresponding to the chroma sample. In this way, the luma values of the preset quantity of luma samples can be obtained.

The preset quantity of luma samples are divided into two sets: the first luma sample set and the second luma sample set. The quantity of luma samples in the first luma sample set is the same as the quantity of luma samples in the second luma sample set, and the luma values of the luma samples in the first luma sample set are greater than or equal to the luma values of the luma samples in the second luma sample set (for example, if the preset quantity is 4, two luma samples with larger luma values are grouped into the first luma sample set, and two luma samples with smaller luma values are grouped into the second luma sample set). Then, an average value of the luma values of the luma samples in the first luma sample set is determined, the average value is determined as the maximum luma value maxY. An average value of the luma values of the luma samples in the second luma sample set is determined, and the average value is determined as the minimum luma value minY.

In the corresponding manner 2, a process of determining the first chroma value and the second chroma value may be as follows:

An obtained average value of sample values of chroma samples of the luma samples in the first luma sample set is determined as the first chroma value, and an obtained average value of sample values of chroma samples of the luma samples in the second luma sample set is determined as the second chroma value.

It should be further noted that "determining is performed until the current chroma block" may be "encoding is performed until the current chroma block", or may be "decoding is performed until the current chroma block".

Operation 1102: If a first difference between the maximum luma value and the minimum luma value is greater than 0, process the first difference based on a quantity of significant bits of the first difference and a first preset bit depth to obtain a second difference.

The first preset bit depth is a bit depth preset for the first difference, and is stored in the apparatus mentioned above.

During implementation, after the maximum luma value and the minimum luma value are obtained, a difference between the maximum luma value and the minimum luma value, namely, the first difference, may be determined. Then, whether the first difference is greater than 0 is determined. If the first difference is greater than 0, the quantity of significant bits of the first difference is determined, and then the first difference is processed (for example, shifted to the right) by using the quantity of significant bits of the first difference and the first preset bit depth to obtain the second difference. A bit depth of the second difference is less than the bit depth of the first difference.

In an embodiment, the first preset bit depth is less than a bit depth of the luma samples.

During implementation, the first preset bit depth may be set to be less than the bit depth of the luma samples. For example, if the bit depth of the luma samples is 8 bits, the first preset bit depth may be 1 bit, 3 bits, 4 bits, 6 bits, or the like.

Operation 1103: Determine, based on the first chroma value, the second chroma value, and the second difference, an intra prediction model parameter corresponding to the target chroma block.

The intra prediction model parameter includes a scaling coefficient and an offset factor.

During implementation, after the second difference is obtained, the scaling coefficient and the offset factor that correspond to the target chroma block may be determined based on the first chroma value, the second chroma value, and the second difference.

Operation 1104: Determine prediction information of the target chroma block based on the intra prediction model parameter and luma reconstruction information corresponding to the target chroma block.

During implementation, after the intra prediction model parameter corresponding to the target chroma block is determined, the luma reconstruction information corresponding to the target chroma block may be obtained, and then the prediction information of the target chroma block is determined based on the intra prediction model parameter determined in operation 1103 and the luma reconstruction information corresponding to the target chroma block.

After operation 1104, in an embodiment, the method further includes: adding a residual signal to the prediction information determined in operation 1104, to obtain a reconstructed signal of the current chroma block.

Figure 12:
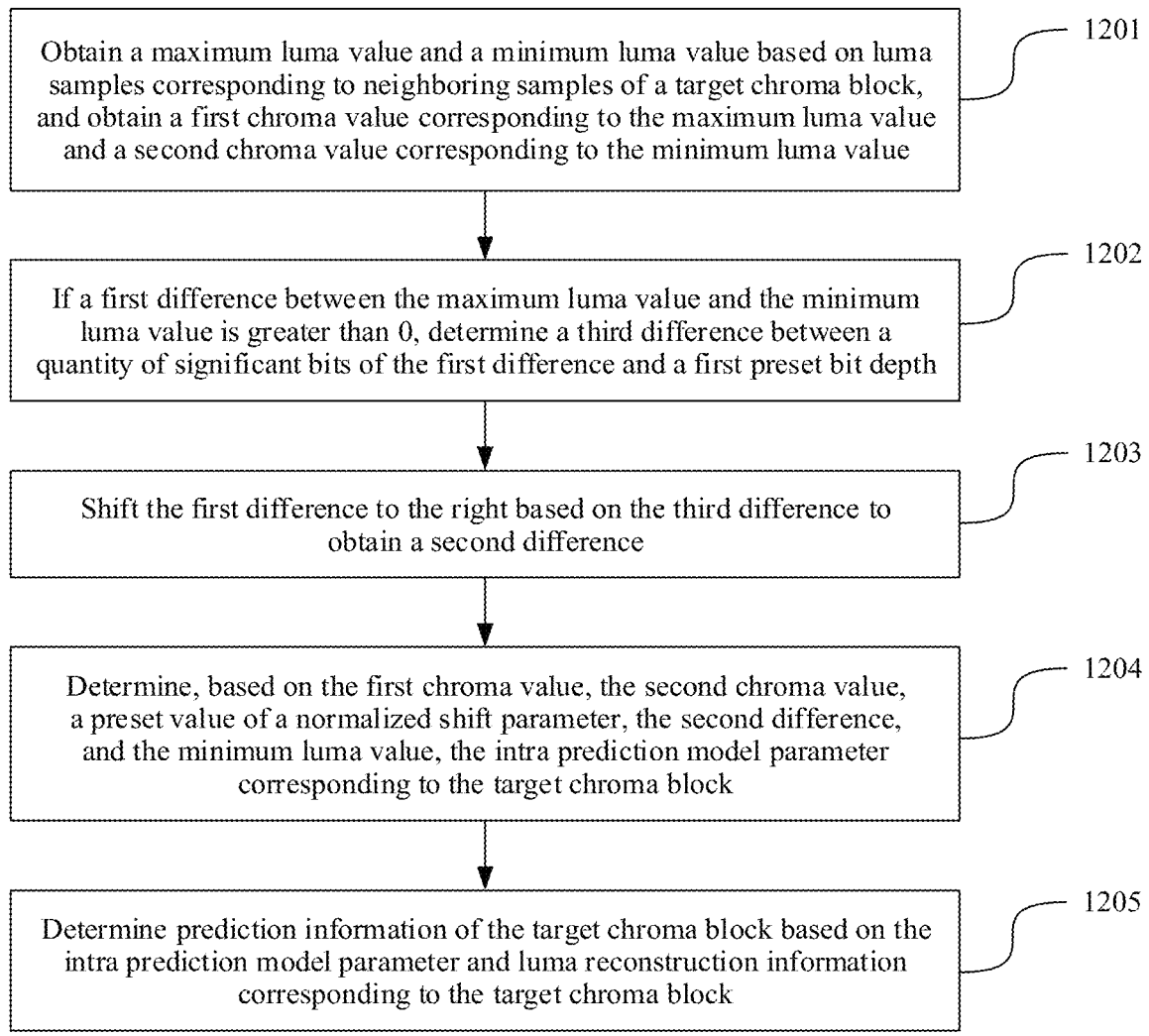
FIG. 12 is a schematic flowchart of a chroma block prediction method according to an embodiment.

Another embodiment of this application describes an example in which intra prediction uses a CCLM. This process exists in both an encoding process and a decoding process, as shown in FIG. 12.

Operation 1201: Obtain a maximum luma value and a minimum luma value based on luma samples corresponding to neighboring samples of a target chroma block, and obtain a first chroma value corresponding to the maximum luma value and a second chroma value corresponding to the minimum luma value.

For a processing process of operation 1201, refer to the process of operation 1101.

Operation 1202: If a first difference between the maximum luma value and the minimum luma value is greater than 0, determine a third difference between a quantity of significant bits of the first difference and a first preset bit depth.

During implementation, a difference between the maximum luma value and the minimum luma value, namely, the first difference, may be determined. Then, whether the first difference is greater than 0 may be determined. If the first difference is greater than 0, the quantity of significant bits of the first difference may be determined, and the prestored first preset bit depth may be obtained. Then, a difference between the quantity of significant bits of the first difference and the first preset bit depth, namely, the third difference, may be determined. For example, if the quantity of significant bits of the first difference is 6 and the first preset bit depth is 3, it may be determined that the third difference is 3.

Operation 1203: Shift the first difference to the right based on the third difference to obtain a second difference.

During implementation, after the third difference is determined, whether the third difference is greater than 0 may be determined. If the third difference is greater than 0, the first difference may be shifted to the right based on the third difference to obtain the second difference. For example, if the third difference is 3, the first difference may be shifted to the right by two bits.

In an embodiment, the right shifting may be as follows:

The first difference is shifted to the right by bits of the third difference to obtain the second difference.

During implementation, the first difference may be shifted to the right by the bits of the third difference to obtain the second difference. For example, assuming that the first preset bit depth of the first difference is 3 bits, if the first difference is equal to 10001110, the quantity of significant bits is 8, the third difference is 5, and the second difference is equal to 100. If the first difference is equal to 00001010, the quantity of significant bits is 4, the third difference is 1, and the second difference is equal to 101.

Therefore, when $$\text{Floor}\left(\frac{2^{2N}}{\text{diff}}\right) \text{ and/or Floor}\left(\frac{2^{N}}{\text{diff}}\right)$$

(N is a preset value of a normalized shift parameter, and diff is the second difference) are subsequently determined through a lookup table, a bit depth of diff is less than that of the first difference, and a quantity of diff values in the table is reduced (a reason is described below). This can improve a speed of determining $$\text{Floor}\left(\frac{2^{2N}}{\text{diff}}\right) \text{ and/or Floor}\left(\frac{2^{N}}{\text{diff}}\right)$$

through a lookup table.

Operation 1204: Determine, based on the first chroma value, the second chroma value, the preset value of the normalized shift parameter, the second difference, and the minimum luma value, the intra prediction model parameter corresponding to the target chroma block.

The normalized shift parameter is used to perform shifting, and the preset value of the normalized shift parameter may be preset and stored in the apparatus mentioned above.

During implementation, each chroma block using the CCLM corresponds to an intra prediction model parameter, and the intra prediction model parameter includes an offset factor and a scaling coefficient.

A scaling coefficient and an offset factor corresponding to the target chroma block may be determined based on the first chroma value, the second chroma value, the preset value of the normalized shift parameter, the second difference, the minimum luma value, and a preset formula.

In an embodiment, a value of the normalized shift parameter may be adjusted to determine the intra prediction model parameter. Corresponding processing may be as follows:

The scaling coefficient in the intra prediction model parameter corresponding to the target chroma block is determined based on the first chroma value, the second chroma value, the second difference, and the preset value. The offset factor in the intra prediction model parameter corresponding to the target chroma block is determined based on the scaling coefficient, the second chroma value, the preset value of the normalized shift parameter, and the minimum luma value.

The normalized shift parameter is used to perform shifting. For example, a number is 00001010, a target value of the normalized shift parameter is 1, and the number is shifted to the right to obtain 00000101. The target value of the normalized shift parameter may be used in subsequent determining of prediction information (which may also be referred to as a prediction signal).

During implementation, the preset value of the normalized shift parameter may be obtained, and the preset value is a parameter value preset for the normalized shift parameter. Then, the first chroma value, the second chroma value, the preset value of the normalized shift parameter, and the second difference may be input into a preset formula to obtain the scaling coefficient corresponding to the target chroma block, and then the scaling coefficient, the preset value of the normalized shift parameter, and the minimum luma value are input into another preset formula, to obtain the offset factor corresponding to the target chroma block.

In addition, if the second difference is less than or equal to 0, the target value of the normalized shift parameter is the preset value of the normalized shift parameter. Subsequently, the prediction information may be determined based on the preset value of the normalized shift parameter.

In an embodiment, the target value of the normalized shift parameter may be determined based on the preset value of the normalized shift parameter, and the offset factor is determined based on the target value. Processing may be as follows:

x=Floor(Log 2(diff)) (indicates that a value obtained after Log 2(diff) is rounded down is assigned to x);

normDiff=((diff<<4)>>x) & 15 (indicates that ((diff<<4)>>x) & 15 is assigned to normDiff);

x+=(normDiff!=0)?1:0 (indicates that if normDiff!=0 is true, x+1 is assigned to x; otherwise, x is assigned to x);

y=Floor(Log 2(Abs (maxC−minC)))+1 (indicates that (Floor(Log 2(Abs (maxC−minC)))+1) is assigned to y);

a=((maxC−minC)*(divSigTable[normDiff]|8)+2y−1)>>y (indicates that (((maxC−minC)*(divSigTable [normDiff] |8)+2y−1)>>y) is assigned to a, where a is the scaling coefficient);

k=((3+x−y)<1)?1:(3+x−y) (indicates that if (3+x−y)<1) is true, 1 is assigned to k; otherwise, (3+x−y) is assigned to k, where k is the target value of the normalized shift parameter, and 3 is the preset value of the normalized shift parameter);

a=((3+x−y)<1)?Sign(a)*15:a (indicates that if (3+x−y)<1) is true, Sign(a)*15 is assigned to a; otherwise, a is assigned to a, where Sign( ) is a sign function);

b=minC−((a*minY)>>k) (indicates that (minC−((a*minY)>>k)) is assigned to b).

Note that divSigTable[ ] is as follows:

divSigTable[ ]={0, 7, 6, 5, 5, 4, 4, 3, 3, 2, 2, 1, 1, 1, 1, 0}.

In an embodiment, in another manner, the target value of the normalized shift parameter may be determined based on the preset value of the normalized shift parameter, and the offset factor may be determined based on the target value. Processing may be as follows:

The offset factor in the intra prediction model parameter corresponding to the target chroma block is determined based on the scaling coefficient, the second chroma value, the target value of the normalized shift parameter, and the minimum luma value. The target value of the normalized shift parameter is determined based on the preset value of the normalized shift parameter and the third difference.

During implementation, the preset value of the normalized shift parameter and the third difference are added to obtain the target value of the normalized shift parameter. Then, the scaling coefficient, the target value of the normalized shift parameter, and the minimum luma value are input into a preset formula, to obtain the offset factor corresponding to the target chroma block.

In an embodiment, the preset value of the normalized shift parameter is the bit depth of the first difference, a bit depth of luma samples, a sum of the bit depth of the first difference and a second preset value, a product of the bit depth of the first difference and a third preset value, or a bit depth of one byte.

The second preset value is a positive integer, for example, 4 bits. The third preset value is a positive integer, for example, 2 bits.

During implementation, the preset value of the normalized shift parameter may be set to the bit depth of the first difference. The preset value of the normalized shift parameter may also be set to the bit depth of luma samples.

The preset value of the normalized shift parameter may also be set to the sum of the bit depth of the first difference and the second preset value. For example, the bit depth of the first difference is 4 bits, the second preset value is 4 bits, and the preset value of the normalized shift parameter may be 8 bits.

The preset value of the normalized shift parameter may also be set to the product of the bit depth of the first difference and the third preset value. For example, the bit depth of the first difference is 4 bits, the third preset value is 2, and the preset value of the normalized shift parameter is 8 bits.

The preset value of the normalized shift parameter may be set to the bit depth of one byte.

In this way, the preset value of the normalized shift parameter may be adjusted to any one of the foregoing values, and is less than 16 in the related technology. This can reduce a bit depth of a value in the table for subsequent lookup, and therefore reduce a data amount of the table.

Operation 1205: Determine prediction information of the target chroma block based on the intra prediction model parameter and luma reconstruction information corresponding to the target chroma block.

During implementation, after the scaling coefficient and the offset factor of the target chroma block are determined, a prestored formula predSamples[x][y]=Clip1C(((pDsY[x][y]*a)>>k)+b) for determining prediction information may be obtained. In this formula, predSamples[x][y] is the prediction information of the target chroma block, pDsY[x][y] is a value of a downsampling block of a corresponding luma block, Clip1C( ) is a clipping operation (enables an obtained sample value to fall within a valid range), and k is the target value of the normalized shift parameter. In this formula, because pDsY[x][y], a, and b are all known, predSamples[x][y] of the target chroma block may be determined. In other words, the prediction information (which may also be referred to as a prediction signal) of the target chroma block may be determined.

In this way, for each chroma block that uses the CCLM and that is in each frame of picture, prediction information is obtained according to the foregoing operations and determined, to perform encoding or decoding processing.

After operation 1205, in an embodiment, the method further includes: adding a residual signal to the prediction information determined in operation 1205, to obtain a reconstructed signal of the current chroma block.

In an embodiment, the luma reconstruction information corresponding to the target chroma block includes downsampling information of a luma reconstruction block corresponding to the target chroma block.

In an embodiment, in operation 1204, there are a plurality of manners of determining the scaling coefficient and the offset factor. This embodiment provides three feasible manners:

Manner 1:

$$a = (\text{maxC} - \text{minC}) * \text{Floor}\left(\frac{2^N}{\text{diff}}\right) + div,$$

where a is the scaling coefficient, diff is the second difference, maxC is the first chroma value, minC is the second chroma value, and N is the preset value. b=minC−((a*minY)>>k), where b is the offset factor, a is the scaling coefficient, minC is the second chroma value, minY is the minimum luma value, and k is the target value.

During implementation, a preset scaling coefficient calculation formula $$a = (\text{maxC} - \text{minC}) * \text{Floor}\left(\frac{2^N}{\text{diff}}\right) + div$$

may be obtained. Then, the first chroma value maxC, the second chroma value minC, the preset value N of the normalized shift parameter, and the second difference diff are substituted into the formula, to obtain the scaling coefficient a corresponding to the target chroma block. In this formula, $$div = \left( (\max C - \min C) * \text{Floor}\left(\frac{2^{2N}}{diff}\right) - \text{Floor}\left(\frac{2^{N}}{diff}\right) * 2^{N} + 2^{N-1} \right) >> N,$$

$$\text{Floor}\left(\frac{2^{N}}{diff}\right)$$

indicates that $$\frac{2^{N}}{diff}$$

is rounded down, and $$\text{Floor}\left(\frac{2^{2N}}{diff}\right)$$

indicates that $$\left(\frac{2^{2N}}{diff}\right)$$

is rounded down. For example, if N is 16, $$a = (\max C - \min C) * \text{Floor}\left(\frac{2^{16}}{diff}\right) + div.$$

Then, a preset offset factor calculation formula b=minC−((a*minY)>>k) may be obtained. It indicates that a difference between minC and a value obtained after a*minY is shifted to the right by k bits is calculated, to obtain the offset factor b corresponding to the target chroma block. The scaling coefficient a, the second chroma minC, and the target value k of the normalized shift parameter, and the minimum luma value minY may be substituted into this formula, to determine the offset factor b corresponding to the target chroma block. In the manner 1, k=N+shiftLuma, where shiftLuma is the third difference mentioned above.

It should be noted that, when the scaling coefficient is determined based on $$a = (\max C - \min C) * \text{Floor}\left(\frac{2^{N}}{diff}\right) + div,$$

because diff is a denominator, when this formula is used, a condition that diff is greater than 0 needs to be met. When diff is not greater than 0, the scaling coefficient is 0, and the offset factor is the second chroma value.

Pseudo codes used in the processing process of the operation 1202 to the manner 1 may be expressed as follows:

A=maxY−minY (indicates that the first difference (denoted as A) is the difference between the maximum luma value and the minimum luma value);

shiftLuma=(A==0)?0:Floor(Log 2(Abs(A)))−DIFF_BIT_DEPTH (indicates that the third difference (denoted as shiftLuma) is 0 when the first difference being equal to 0 is true, or the third difference is Floor(Log 2(Abs(A)))−DIFF_BIT_DEPTH when the first difference being equal to 0 is false, where Abs( ) indicates that an absolute value is used, and DIFF_BIT_DEPTH is the first preset bit depth);

shiftLuma=Max(0, shiftLuma) (indicates that the third difference shiftLuma is a larger value between 0 and shiftLuma);

diff=A>>shiftLuma (indicates that the first difference A is shifted to the right by bits of the third difference, to obtain the second difference);

k=N+shiftLuma (indicates that the target value k of the normalized shift parameter is a sum of the preset value N of the normalized shift parameter and the third difference).

If diff is greater than 0, the following applies:

$$a = (\max C - \min C) * \text{Floor}\left(\frac{2^{N}}{diff}\right) + div.$$

Otherwise, the following applies:

$$a = 0;$$

$$b = \min C - ((a * \min Y) >> k), \text{ where}$$

$$div = \left( (\max C - \min C) * \text{Floor}\left(\frac{2^{2N}}{diff}\right) - \text{Floor}\left(\frac{2^{N}}{diff}\right) * 2^{N} + 2^{N-1} \right) >> N,$$

a is the scaling coefficient, maxC is the first chroma, minC is the second chroma, k is the target value of the normalized shift parameter, minY is the minimum luma value, b is the offset factor, diff is the second difference, and N is the preset value of the normalized shift parameter.

It should be noted that the texts in the brackets are used to explain a preceding statement.

Manner 2:

$$a = (\max C - \min C) * \text{Floor}\left(\frac{2^{N}}{diff}\right),$$

where a is the scaling coefficient, diff is the second difference, maxC is the first chroma value, minC is the second chroma value, and N is a preset value. b=minC−((a*minY)>>k) where b is the offset factor, a is the scaling coefficient, minY is the minimum luma value, and k is the target value.

During implementation, a preset scaling coefficient calculation formula $$a = (\max C - \min C) * \text{Floor}\left(\frac{2^{N}}{diff}\right)$$

may be obtained. Then, the first chroma value maxC, the second chroma value minC, the preset value of the normalized shift parameter, and the second difference diff are substituted into this formula, to obtain the scaling coefficient. In this formula, $$\text{Floor}\left(\frac{2^N}{\textit{diff}}\right)$$

indicates that $$\frac{2^N}{\textit{diff}}$$

is rounded down.

Then, a preset offset factor calculation formula b=minC−((a*minY)>>k) may be obtained. It indicates that a difference between minC and a value obtained after a*minY is shifted to the right by k bits is calculated, to obtain the offset factor b corresponding to the target chroma block. The scaling coefficient a, the second chroma minC, and the target value k of the normalized shift parameter, and the minimum luma value minY may be substituted into this formula, to determine the offset factor b corresponding to the target chroma block. In the manner 1, k=N+shiftLuma, where shiftLuma is the third difference mentioned above.

It should be noted that, when the scaling coefficient is determined based on $$a = (\text{max}C - \text{min}C) * \text{Floor}\left(\frac{2^N}{\textit{diff}}\right),$$

because diff is a denominator, when this formula is used, a condition that diff is greater than 0 needs to be met. When diff is not greater than 0, the scaling coefficient is 0, and the offset factor is the second chroma value.

Pseudo codes used in the processing process of the operation 1202 to the manner 2 may be expressed as follows:

A=maxY−minY (indicates that the first difference (denoted as A) is the difference between the maximum luma value and the minimum luma value);

ShiftLuma=(A==0)?0:Floor(Log 2(Abs(A)))−DIFF_BIT_DEPTH (indicates that the third difference (denoted as shiftLuma) is 0 when the first difference being equal to 0 is true, or the third difference is Floor(Log 2(Abs(A)))−DIFF_BIT_DEPTH when the first difference being equal to 0 is false, where Abs( ) indicates that an absolute value is used, and DIFF_BIT_DEPTH is the first preset bit depth);

shiftLuma=Max(0, shiftLuma) (indicates that the third difference shiftLuma is a larger value between 0 and shiftLuma);

diff=A>>shiftLuma (indicates that the first difference A is shifted to the right by bits of the third difference, to obtain the second difference);

k=N+shiftLuma (indicates that the target value k of the normalized shift parameter is a sum of the preset value N of the normalized shift parameter and the third difference).

If diff is greater than 0, the following applies:

$$a = (\text{max}C - \text{min}C) * \text{Floor}\left(\frac{2^N}{\textit{diff}}\right).$$

Otherwise, the following applies:
a=0; and
b=minC−((a*minY)>>k), where a is the scaling coefficient, maxC is the first chroma, minC is the second chroma, k is the target value of the normalized shift parameter, minY is the minimum luma value, b is the offset factor, diff is the second difference, and N is the preset value of the normalized shift parameter.

It should be noted that the texts in the brackets are used to explain a preceding statement.

It should be noted that, when $$\text{Floor}\left(\frac{2^N}{\textit{diff}}\right) \text{ and } \text{Floor}\left(\frac{2^{2N}}{\textit{diff}}\right)$$

are usually determined through a lookup table. If a bit depth of diff is 10 bits, a value range of diff is 0 to 1023, and there are a total of 1024 cases. If a value of diff is used as a column, there are 1024 columns. If $2^{16}$ is used as a row, there is one row. In other words, there is a 1×1024 table. In this table, each value of $2^{16}$ corresponding to diff has a numeric value, which is a calculation result of $$\text{Floor}\left(\frac{2^{16}}{\textit{diff}}\right).$$

In this way, two tables are required for $$\text{Floor}\left(\frac{2^N}{\textit{diff}}\right)$$

and $$\text{Floor}\left(\frac{2^{2N}}{\textit{diff}}\right).$$

One table is looked up to find a calculation result of $$\text{Floor}\left(\frac{2^N}{\textit{diff}}\right),$$

and the other table is looked up to find a calculation result of $$\text{Floor}\left(\frac{2^{2N}}{\textit{diff}}\right).$$

In the manner 1 and the manner 2, the first difference A is shifted to the right to obtain the second difference diff, and accordingly $$\text{Floor}\left(\frac{2^N}{A}\right)$$

is changed to $$\text{Floor}\left(\frac{2^N}{\text{diff}}\right).$$

A bit depth of a denominator is less than that of $$\text{Floor}\left(\frac{2^N}{A}\right)$$

in the related technology, and this can improve a speed of determining $$\text{Floor}\left(\frac{2^N}{A}\right)$$

through a lookup table. A speed of a lookup table may be improved because the bit depth of A is reduced and a quantity of all possible values of A in a table is reduced. For example, if the bit depth of A is 10 bits, there are a total of $2^{10}$ values in the table. After the bit depth of diff is changed to 3 bits, there are a total of $2^3$ values in the table. In this case, a size of the table is reduced. In addition, in the manner 1 and the manner 2, A is not directly shifted to the right by bits of the first preset bit depth, but A is shifted to the right by bits of a difference between A and the first preset bit depth, to reserve the significant bits of A as much as possible. This can improve encoding and decoding performance.

In addition, the scaling coefficient and the offset factor are determined in both the manner 1 and manner 2. However, compared with the manner 1, in the manner 2, a div parameter is not used when the scaling coefficient is determined. Therefore, $$\text{Floor}\left(\frac{2^{2N}}{\text{diff}}\right)$$

is not included in the manner 2, and $$\text{Floor}\left(\frac{2^{2N}}{\text{diff}}\right)$$

does not need to be searched and calculated. In the manner 2, only one table needs to be stored, which is used to determine a calculation result of $$\text{Floor}\left(\frac{2^N}{\text{diff}}\right).$$

In addition, because the div parameter is not used, there is no $$(\text{maxC} - \text{minC}) * \text{Floor}\left(\frac{2^{2N}}{\text{diff}}\right).$$

In other words, there is no large number multiplication operation. Therefore, this can lower complexity of calculating the scaling coefficient, and quickly determine the scaling coefficient.

In addition, in the manner 1, A may be further refined. To be specific, addDiff is added to A, and addDiff=(shiftLuma)?1<<(shiftLuma−1):0 (if shiftLuma being not equal to 0 is true, addDiff is 1<<(shiftLuma−1); if shiftLuma being not equal to 0 is false, addDiff is 0). In this way, the pseudo codes in the manner 1 may be expressed as follows:

```
A= maxY − minY;
shiftLuma = (A= =0) ? 0 : Floor(Log2(Abs(A))) − DIFF_BIT_DEPTH;
shiftLuma = Max(0, shiftLuma);
addDiff=(shiftLuma)?1 <<(shiftLuma−1) : 0;
diff = (A + addDiff ) >> shiftLuma;
k = N + shiftLuma.
```

If diff is greater than 0, the following applies:

$$a = (\text{maxC} - \text{minC}) * \text{Floor}\left(\frac{2^N}{\text{diff}}\right) + div.$$

Otherwise, the following applies:
a=0;
b=minC−((a*minY)>>k).

In addition, in the manner 2, A may be further refined. To be specific, addDiff is added to A, and addDiff=(shiftLuma)?1<<(shiftLuma−1):0 (if shiftLuma being not equal to 0 is true, addDiff is 1<<(shiftLuma−1); if shiftLuma being not equal to 0 is false, addDiff is 0). In this way, the pseudo codes in the manner 1 may be expressed as follows:

```
A= maxY − minY;
shiftLuma = (A= =0) ? 0 : Floor(Log2(Abs(A))) − DIFF_BIT_DEPTH;
shiftLuma = Max(0, shiftLuma);
addDiff = (shiftLuma)?1 <<(shiftLuma−1) : 0
diff = (A + addDiff ) >> shiftLuma; and
k = N + shiftLuma.
```

If diff is greater than 0, the following applies:

$$a = (\text{maxC} - \text{minC}) * \text{Floor}\left(\frac{2^N}{\text{diff}}\right).$$

Otherwise, the following applies:
a=0; and
b=minC−((a*minY)>>k).

Manner 3: An initial scaling coefficient in the intra prediction model parameter corresponding to the target chroma block is determined based on the first chroma value, the second chroma value, the preset value, and the second difference.

If a fourth difference between a quantity of significant bits of the initial scaling coefficient and a second preset bit depth is greater than 0, the initial scaling coefficient is shifted to the right based on the fourth difference to obtain the scaling coefficient in the intra prediction model parameter corresponding to the target chroma block. b=minC−((a*minY)>>k), where b is the offset factor, a is the scaling coefficient, minC is the second chroma value, minY is the minimum luma value, and k is the target value.

The second preset bit depth is a bit depth preset for the corresponding scaling coefficient, and is stored in the apparatus mentioned above. For example, the second preset bit depth may be less than 26 bits, or may be 16 bits, 10 bits, 8 bits, or the like.

During implementation, the initial scaling coefficient in the intra prediction model parameter corresponding to the target chroma block may be determined based on the first chroma value, the second chroma value, the preset value, and the second difference. For this process, refer to the manner 1 or the manner 2. Then, the second preset bit depth corresponding to the scaling coefficient may be obtained, the fourth difference between the quantity of significant bits of the initial scaling coefficient and the second preset bit depth is determined, and whether the fourth difference is greater than 0 is determined. If the fourth difference is greater than 0, the initial scaling coefficient is shifted to the right based on the fourth difference to obtain the scaling coefficient corresponding to the target chroma block. For example, if the fourth difference is 4, the initial scaling coefficient may be shifted to the right by three bits.

After the scaling coefficient is determined, a target scaling factor may be determined. A determining manner is the same as processing in the manner 1 or the manner 2. Details are not described herein again.

In an embodiment, the right shifting in the manner 3 may be as follows:

The initial scaling coefficient is shifted to the right by bits of the fourth difference, to obtain the scaling coefficient in the intra prediction model parameter corresponding to the target chroma block.

During implementation, after it is determined that the fourth difference is greater than 0, the initial scaling coefficient may be shifted to the right by the bits of the fourth difference, to obtain the scaling coefficient in the intra prediction model parameter corresponding to the target chroma block.

In an embodiment, the target value of the normalized shift parameter may also be adjusted based on the shifted scaling coefficient. Corresponding processing may be as follows:

If the fourth difference is greater than 0, a difference between the fourth difference and a sum of the preset value of the normalized shift parameter and the third difference is determined as the target value of the normalized shift parameter.

During implementation, if the third difference is greater than 0 and the fourth difference between the quantity of significant bits of the initial scaling coefficient and the second preset bit depth is greater than 0, the difference between the fourth difference and the sum of the preset value of the normalized shift parameter and the third difference may be determined, and then the difference may be determined as the target value of the normalized shift parameter.

In the manner 3, after the target value of the normalized shift parameter is obtained, a manner of determining the offset factor may be as follows: A preset offset factor calculation formula b=minC−((a*minY)>>k) may be obtained, which indicates that a difference between minC and a value obtained after a*minY is shifted by k bits to the right is obtained, to obtain the offset factor b corresponding to the target chroma block. The scaling coefficient a, the second chroma minC, the target value k of the normalized shift parameter, and the minimum luma value minY are substituted into this formula, to determine the offset factor b corresponding to the target chroma block. K=N+shiftLuma−shiftA, where shiftLuma is the third difference mentioned above, N is the preset value of the normalized shift parameter mentioned above, and shiftA is the fourth difference.

It should be noted that, in the manner 3, because the offset factor is obtained based on the scaling coefficient and the target value of the normalized shift parameter, the offset factor also changes. In other words, the offset factor may be recalculated according to a formula b=minC−((a*minY)>>k), to obtain an offset factor b. In this formula, minC indicates the second chroma value, a is the scaling coefficient, minY is the minimum luma value, and k is the target value (namely, the fourth difference) of the normalized shift parameter.

It should further be noted that, this process is equivalent to further adjusting based on the determined scaling coefficient and the determined offset factor. Because the initial scaling coefficient is shifted, after the scaling coefficient is obtained, the bit depth of the scaling coefficient is reduced. Therefore, this can lower complexity of subsequently determining multiplication in the prediction information.

In addition, if the fourth difference is not greater than 0, the initial scaling coefficient is not shifted. In other words, the scaling coefficient is the same as the initial scaling coefficient, and an initial offset factor is the same as the offset factor.

If the initial scaling coefficient is obtained in the manner 1, pseudo codes used in the process of the manner 3 may be as follows:

A=maxY−minY (indicates that the first difference (denoted as A) is the difference between the maximum luma value and the minimum luma value);

shiftLuma=(A==0)?0:Floor(Log 2(Abs(A)))−DIFF_BIT_DEPTH (indicates that the third difference (denoted as shiftLuma) is 0 when the first difference being equal to 0 is true, or the third difference is Floor(Log 2(Abs(A)))−DIFF_BIT_DEPTH when the first difference being equal to 0 is false, where Abs( ) indicates that an absolute value is used, and DIFF_BIT_DEPTH is the first preset bit depth);

shiftLuma=Max(0, shiftLuma) (indicates that the third difference shiftLuma is a larger value between 0 and shiftLuma);

diff=A>>shiftLuma (indicates that the first difference A is shifted to the right by bits of the third difference, to obtain the second difference);

k=N+shiftLuma (indicates that the target value k of the normalized shift parameter is a sum of the preset value N of the normalized shift parameter and the third difference).

If diff is greater than 0, the following applies:

$$a = (\text{max}C - \text{min}C) * \text{Floor}\left(\frac{2^N}{\text{diff}}\right) + \text{div}, \text{ where}$$

$$\text{div} = \left((\text{max}C - \text{min}C) * \text{Floor}\left(\frac{2^{2N}}{\text{diff}}\right) - \text{Floor}\left(\frac{2^N}{\text{diff}}\right) * 2^N + 2^{N-1}\right) >> N;$$

shiftA=(a==0)?0:Floor(Log 2(Abs(a)))−A_BIT_DEPTH (indicates that the fourth difference (denoted as shift A) is 0 when a being equal to 0 is true, or the fourth difference is Floor(Log 2(Abs(a)))−A_BIT_DEPTH when a being equal to 0 is false, where Abs( ) indicates that an absolute value is used, and A_BIT_DEPTH is the second preset bit depth);

shiftA=Max(0, shiftA) (indicates that the fourth difference shiftA is a larger value between 0 and shiftA);

a=a>>shiftA (indicates that a is shifted to the right by bits of the fourth difference to obtain the scaling coefficient);
k=N+shiftLuma-shiftA (indicates that the target value k of the normalized shift parameter is equal to a difference between the fourth difference and a sum of the preset value N of the normalized shift parameter and the third difference).

Otherwise, the following applies:
a=0;
b=minC-((a*minY)>>k).

In addition, the scaling coefficient may further be refined. To be specific, addA is added to the initial scaling coefficient, and then (a+addA) is shifted to the right by shiftA, to determine a final scaling coefficient. addA=(shiftA)?1<<(shiftA-1):0 (a value of addA is: if shiftA being not equal to 0 is true, addA is 1<<(shiftA-1); if shiftA being not equal to 0 is false, addA is set to 0). In this way, pseudo codes for shifting the initial scaling coefficient obtained in the manner 1 may be expressed as follows:

A = maxY − minY;
shiftLuma = (A= =0) ? 0 : Floor(Log2(Abs(A))) − DIFF_BIT_DEPTH;
shiftLuma = Max(0, shiftLuma);
diff = A >> shiftLuma;
k = N + shiftLuma.

If diff is greater than 0, the following applies:

$$a = (maxC - minC) * \text{Floor}\left(\frac{2^N}{\textit{diff}}\right) + div; \text{ where}$$

$$div = \left((maxC - minC) * \text{Floor}\left(\frac{2^{2N}}{\textit{diff}}\right) - \text{Floor}\left(\frac{2^N}{\textit{diff}}\right) * 2^N + 2^{N-1}\right) >> N;$$

shiftA=(a==0)?0:Floor(Log 2(Abs(a)))−A_BIT_DEPTH;
shiftA=Max(0, shiftA);
addA=shiftA?1<<(shiftA−1):0;
a=(a+addA)>>shiftA;
k=N+shiftLuma−shiftA;
b=minC−((a*minY)>>k).
Otherwise, the following applies:
a=0; and
b=minC−((a*minY)>>k).

In this way, because a is refined, the subsequently obtained prediction information is more accurate.

If the initial scaling coefficient is obtained in the manner 2, the pseudo codes used in the process in the manner 3 may be expressed as follows:

A = maxY − minY;
shiftLuma = (A= =0) ? 0 : Floor(Log2(Abs(A))) − DIFF_BIT_DEPTH;
shiftLuma = Max(0, shiftLuma);
diff = A>> shiftLuma;
k = N + shiftLuma.

If diff is greater than 0, the following applies:

$$a = (maxC - minC) * \text{Floor}\left(\frac{2^N}{\textit{diff}}\right);$$

shiftA=(a==0)?0:Floor(Log 2(Abs(a)))−A_BIT_DEPTH;
shiftA=Max(0, shiftA);
a=a>>shiftA;
k=N+shiftLuma−shiftA;
b=minC−((a*minY)>>k).

Otherwise, the following applies:
a=0; and
b=minC−((a*minY)>>k).

In addition, the scaling coefficient may further be refined. To be specific, addA is added to the initial scaling coefficient, and then (a+addA) is shifted to the right by shiftA, to determine the final scaling coefficient. addA=(shiftA)?1<<(shiftA−1):0 (a value of addA is: if shiftA being not equal to 0 is true, addA is 1<<(shiftA−1); if shiftA being not equal to 0 is false, addA is set to 0). In this way, the pseudo codes for shifting the initial scaling coefficient obtained in the manner 2 are expressed as follows:

A = maxY − minY;
shiftLuma = (A= =0) ? 0 : Floor(Log2(Abs(A))) − DIFF_BIT_ DEPTH;
shiftLuma = Max(0, shiftLuma);
diff = A>> shiftLuma;
k = N + shiftLuma;

If diff is greater than 0, the following applies:

$$a = (maxC - minC) * \text{Floor}\left(\frac{2^N}{\textit{diff}}\right)$$

shiftA=(a==0)?0:Floor(Log 2(Abs(a)))−A_BIT_DEPTH;
shiftA=Max(0, shiftA);
addA=shiftA?1<<(shiftA−1):0;
a=(a+addA)>>shiftA;
k=N+shiftLuma−shiftA.
b=minC−((a*minY)>>k)
Otherwise, the following applies:
a=0
b=minC−((a*minY)>>k).

In this way, because a is refined, the subsequently obtained prediction information is more accurate.

In an embodiment, the second preset bit depth is a bit depth of an intra interpolation filter coefficient.

During implementation, the second preset bit depth is set to the bit depth of the intra interpolation filter coefficient, to align with complexity of intra prediction. For example, in an existing standard, the bit depth of the intra interpolation filter coefficient is 6 bits, and the second preset bit depth may also be 6 bits.

In an embodiment, in this embodiment of this application, when the first difference is not greater than 0, a method for determining the scaling coefficient and the offset factor may be as follows:

If the first difference is not greater than 0, it is determined that the scaling coefficient in the intra prediction model parameter is 0, and it is determined that the offset factor in the intra prediction model parameter is the second chroma value.

During implementation, if the first difference is not greater than 0, it may be determined that the scaling coefficient is 0. Then, the second chroma value, the target value of the normalized shift parameter, and the minimum luma value are substituted into the formula b=minC−((a*minY)>>k), to obtain b=minC. In other words, the offset factor is the second chroma value.

The foregoing method embodiments and specific implementations thereof may be executed by the apparatuses or systems shown in FIG. 1 to FIG. 5.

In this embodiment of this application, when the prediction information of the target chroma block is determined, the maximum luma value and the minimum luma value in the luma samples corresponding to the neighboring samples of the target chroma block may be obtained, the first chroma value corresponding to the maximum luma value and the second chroma value corresponding to the minimum luma value may be obtained, and then the first difference between the maximum luma value and the minimum luma value may be determined. If the first difference is greater than 0, the first difference may be shifted to the right based on the quantity of significant bits of the first difference and the first preset bit depth to obtain the second difference. Then, an intra prediction model parameter corresponding to the target chroma block is determined based on a first chroma value, a second chroma value, and the second difference, and then the prediction information of the target chroma block is determined based on the intra prediction model parameter and luma reconstruction information corresponding to the target chroma block. In this way, when the intra prediction model parameter is determined, the first difference between the maximum luma value and the minimum luma value is shifted to the right based on the quantity of significant bits of the first difference and the first preset bit depth. This can reduce a calculation amount of the intra prediction model parameter, and improve prediction efficiency of the chroma block.

The intra prediction model parameter includes the scaling coefficient and the offset factor. To be specific, when the scaling coefficient is determined, the first difference between the maximum luma value and the minimum luma value is shifted to the right based on the quantity of significant bits of the first difference and the first preset bit depth. Therefore, this can reduce calculation amounts of determining the scaling coefficient and the offset factor, lower complexity of determining the prediction information, and improve prediction efficiency of the chroma block.

Figure 13:
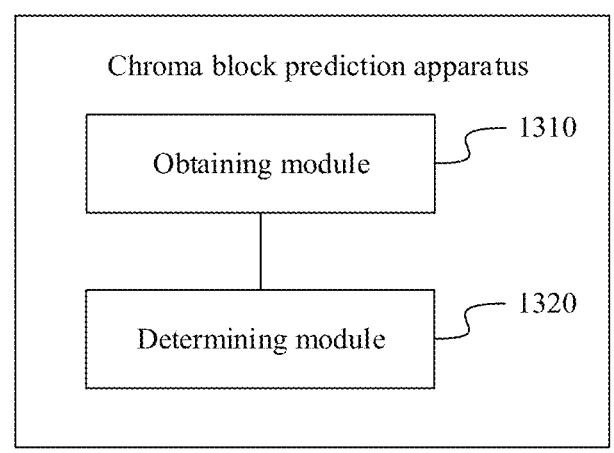
FIG. 13 is a schematic diagram of a structure of a chroma block prediction apparatus.

FIG. 13 is a diagram of a structure of a chroma block prediction apparatus according to an embodiment of this application. The apparatus may be implemented as a part of the apparatus or the entire apparatus by using software, hardware, or a combination thereof. The apparatus provided in this embodiment of this application may implement the procedures in FIG. 11 and FIG. 12 in the embodiments of this application. The apparatus includes an obtaining module 1310 and a determining module 1320.

The obtaining module 1310 is configured to obtain a maximum luma value and a minimum luma value based on luma samples corresponding to neighboring samples of a target chroma block, and obtain a first chroma value corresponding to the maximum luma value and a second chroma value corresponding to the minimum luma value. The obtaining module 1310 may be specifically configured to implement obtaining functions and included implicit operations shown in FIG. 11 and FIG. 12.

The determining module 1320 is configured to:
if a first difference between the maximum luma value and the minimum luma value is greater than 0, process the first difference based on a quantity of significant bits of the first difference and a first preset bit depth to obtain a second difference, where a bit depth of the second difference is less than a bit depth of the first difference;
determine, based on the first chroma value, the second chroma value, and the second difference, an intra prediction model parameter corresponding to the target chroma block; and
determine prediction information of the target chroma block based on the intra prediction model parameter and luma reconstruction information corresponding to the target chroma block. The determining module 1320 may be specifically used to implement determining functions and included implicit operations shown in FIG. 11 and FIG. 12.

In an embodiment, the obtaining module 1310 is configured to:
obtain the maximum luma value and the minimum luma value in the luma samples corresponding to neighboring samples of the target chroma block.

In an embodiment, the obtaining module 1310 is configured to:
divide a preset quantity of luma samples corresponding to a preset quantity of neighboring samples of the target chroma block into a first luma sample set and a second luma sample set, where a quantity of luma samples in the first luma sample set is the same as a quantity of luma samples in the second luma sample set, and luma values of the luma samples in the first luma sample set are greater than or equal to luma values of the luma samples in the second luma sample set; and determine the maximum luma value based on the first luma sample set, and determine the minimum luma value based on the second luma sample set.

In an embodiment, the determining module 1320 is configured to:
shift the first difference to the right to obtain the second difference.

In an embodiment, the determining module 1320 is configured to:
determine a third difference between the quantity of significant bits of the first difference and the first preset bit depth; and
shift the first difference to the right based on the third difference to obtain the second difference, where the third difference is greater than 0.

In an embodiment, the determining module 1320 is configured to:
shift the first difference to the right by bits of the third difference to obtain the second difference.

In an embodiment, the determining module 1320 is configured to:
determine, based on the first chroma value, the second chroma value, a preset value of a normalized shift parameter, the second difference, and the minimum luma value, the intra prediction model parameter corresponding to the target chroma block.

In an embodiment, the determining module 1320 is configured to:
determine, based on the first chroma value, the second chroma value, the second difference, and the preset value, a scaling coefficient in the intra prediction model parameter corresponding to the target chroma block; and determine, based on the scaling coefficient, the second chroma value, the preset value of the normalized shift parameter, and the minimum luma value, an offset factor in the intra prediction model parameter corresponding to the target chroma block.

In an embodiment, the determining module 1320 is configured to:
determine, based on the scaling coefficient, the second chroma value, a target value of the normalized shift parameter, and the minimum luma value, the offset factor in the intra prediction model parameter corresponding to the target chroma block, where the target value of the normalized shift parameter is determined based on the preset value of the normalized shift parameter and the third difference.

In an embodiment, the determining module 1320 is configured to:

$$a = (\mathrm{maxC} - \mathrm{minC}) * \mathrm{Floor}\left(\frac{2^N}{\mathit{diff}}\right),$$

where a is the scaling coefficient, diff is the second difference, maxC is the first chroma value, minC is the second chroma value, and N is the preset value.

The determining module 1320 is configured to:

$$a = (\mathrm{maxC} - \mathrm{minC}) * \mathrm{Floor}\left(\frac{2^N}{\mathit{diff}}\right) + \mathit{div}, \text{ where}$$

$$\mathit{div} = \left((\mathrm{maxC} - \mathrm{minC}) * \mathrm{Floor}\left(\frac{2^{2N}}{\mathit{diff}}\right) - \mathrm{Floor}\left(\frac{2^N}{\mathit{diff}}\right) * 2^N + 2^{N-1}\right) >> N,$$

a is the scaling coefficient, diff is the second difference, maxC is the first chroma value, minC is the second chroma value, and N is the preset value.

In an embodiment, the determining module 1320 is configured to:

determine, based on the first chroma value, the second chroma value, the preset value, and the second difference, an initial scaling coefficient in the intra prediction model parameter corresponding to the target chroma block; and if a fourth difference between a quantity of significant bits of the initial scaling coefficient and a second preset bit depth is greater than 0, shift the initial scaling coefficient to the right based on the fourth difference to obtain the scaling coefficient in the intra prediction model parameter corresponding to the target chroma block.

In an embodiment, the determining module 1320 is configured to:

shift the initial scaling coefficient to the right by bits of the fourth difference to obtain the scaling coefficient in the intra prediction model parameter corresponding to the target chroma block.

In an embodiment, the determining module 1320 is configured to:

if the fourth difference is greater than 0, determine a difference between the fourth difference and a sum of the preset value of the normalized shift parameter and the third difference as the target value of the normalized shift parameter.

In an embodiment, the determining, based on the scaling coefficient, the second chroma value, the target value, and the minimum luma value, an offset factor in the intra prediction model parameter corresponding to the target chroma block includes:

b=minC−((a*minY)>>k), where b is the offset factor, a is the scaling coefficient, minC is the second chroma value, minY is the minimum luma value, and k is the target value.

In an embodiment, the luma reconstruction information corresponding to the target chroma block includes downsampling information of a luma reconstruction block corresponding to the target chroma block.

In an embodiment, the first chroma value corresponds to the maximum luma value, and the second chroma value corresponds to the minimum luma value.

In this embodiment of this application, when the prediction information of the target chroma block is determined, the apparatus may obtain the maximum luma value and the minimum luma value in the luma samples corresponding to the neighboring samples of the target chroma block, obtain the first chroma value corresponding to the maximum luma value and the second chroma value corresponding to the minimum luma value, and then determine the first difference between the maximum luma value and the minimum luma value. If the first difference is greater than 0, the first difference may be shifted to the right based on the quantity of significant bits of the first difference and the first preset bit depth to obtain the second difference. Then, an intra prediction model parameter corresponding to the target chroma block is determined based on a first chroma value, a second chroma value, and the second difference, and then the prediction information of the target chroma block is determined based on the intra prediction model parameter and luma reconstruction information corresponding to the target chroma block. In this way, when the intra prediction model parameter is determined, the first difference between the maximum luma value and the minimum luma value is shifted to the right based on the quantity of significant bits of the first difference and the first preset bit depth. This can reduce a calculation amount of the intra prediction model parameter, and improve prediction efficiency of the chroma block.

The intra prediction model parameter includes the scaling coefficient and the offset factor. To be specific, when the scaling coefficient is determined, the first difference between the maximum luma value and the minimum luma value is shifted to the right based on the quantity of significant bits of the first difference and the first preset bit depth. Therefore, this can reduce calculation amounts of determining the scaling coefficient and the offset factor, lower complexity of determining the prediction information, and improve prediction efficiency of the chroma block.

It should be noted that when the chroma block prediction apparatus provided in the foregoing embodiment determines the prediction information of the chroma block, division into the foregoing functional modules is used only as an example for description. During actual application, the foregoing functions may be allocated to different functional modules as required. In other words, an internal structure of the apparatus is divided into different functional modules to complete all or some of the described functions. In addition, the chroma block prediction apparatus provided in the foregoing embodiment has a same concept as the chroma block prediction method embodiment. For details about a specific implementation process of the chroma block prediction apparatus, refer to the method embodiment. Details are not described herein again.

This application further provides a computer-readable storage medium. The computer-readable storage medium stores computer instructions. When the computer instructions in the computer-readable storage medium are run on a computing device, the computing device is enabled to perform the chroma block prediction method.

This application further provides a computer program product including instructions. When the computer program product runs on a computing device, the computing device is enabled to perform the chroma block prediction method.

All or some of the foregoing embodiments may be implemented by using software, hardware, firmware, or any combination thereof. When the software is used for implementation, all or some of the embodiments may be implemented in a form of the computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state drive).

The foregoing descriptions are merely specific implementations of this application, but are not intended to limit this application. Any modification, equivalent replacement, or improvement made without departing from the spirit and principle of this application should fall within the protection scope of this application.

What is claimed is:

1. A chroma block prediction method, comprising:
   obtaining a maximum luma value and a minimum luma value based on luma samples corresponding to neighboring samples of a target chroma block;
   if a first difference between the maximum luma value and the minimum luma value is not equal to 0, processing the first difference based on a quantity of significant bits of the first difference and a first preset bit depth to obtain a second difference;
   determining, based on a first chroma value, a second chroma value, and the second difference, an intra prediction model parameter corresponding to the target chroma block, wherein the first chroma value and the second chroma value are determined based on the neighboring samples of the target chroma block; and
   determining prediction information of the target chroma block based on the intra prediction model parameter and luma reconstruction information corresponding to the target chroma block.

2. The method according to claim 1, wherein the obtaining a maximum luma value and a minimum luma value based on luma samples corresponding to neighboring samples of a target chroma block comprises:
   dividing a preset quantity of luma samples corresponding to a preset quantity of neighboring samples of the target chroma block into a first luma sample set and a second luma sample set, wherein a quantity of luma samples in the first luma sample set is the same as a quantity of luma samples in the second luma sample set, and luma values of the luma samples in the first luma sample set are greater than or equal to luma values of the luma samples in the second luma sample set; and
   determining the maximum luma value based on the first luma sample set, and determining the minimum luma value based on the second luma sample set.

3. The method according to claim 1, wherein the processing the first difference to obtain a second difference comprises:
   shifting the first difference to the right to obtain the second difference, wherein a bit depth of the second difference is not larger than a preset value.

4. The method according to claim 3, wherein the processing the first difference based on a quantity of significant bits of the first difference and a first preset bit depth to obtain a second difference comprises:
   determining a third difference between the quantity of significant bits of the first difference and the first preset bit depth; and
   shifting the first difference to the right by bits of the third difference to obtain the second difference, wherein the third difference is greater than 0.

5. The method according to claim 1, wherein the determining, based on a first chroma value, a second chroma value, and the second difference, an intra prediction model parameter corresponding to the target chroma block comprises:
   determining, based on the first chroma value, the second chroma value, a preset value of a normalized shift parameter, the second difference, and the minimum luma value, the intra prediction model parameter corresponding to the target chroma block.

6. The method according to claim 5, wherein the determining, based on the first chroma value, the second chroma value, a preset value of a normalized shift parameter, the second difference, and the minimum luma value, the intra prediction model parameter corresponding to the target chroma block comprises:
   determining, based on the first chroma value, the second chroma value, the second difference, and the preset value of the normalized shift parameter, a scaling coefficient in the intra prediction model parameter corresponding to the target chroma block; and
   determining, based on the scaling coefficient, the second chroma value, the preset value of the normalized shift parameter, and the minimum luma value, an offset factor in the intra prediction model parameter corresponding to the target chroma block.

7. The method according to claim 6, wherein the determining, based on the scaling coefficient, the second chroma value, the preset value of the normalized shift parameter, and the minimum luma value, an offset factor in the intra prediction model parameter corresponding to the target chroma block comprises:
   determining, based on the scaling coefficient, the second chroma value, a target value of the normalized shift parameter, and the minimum luma value, the offset factor in the intra prediction model parameter corresponding to the target chroma block, wherein the target value of the normalized shift parameter is determined based on the preset value of the normalized shift parameter.

8. The method according to claim 6, wherein the scaling coefficient a in the intra prediction model parameter is determined based on (maxC−minC) and a value from a lookup table, wherein maxC is the first chroma value, $minC$ is the second chroma value, and the value from the lookup table is determined based on the second difference.

9. The method according to claim 6, wherein the determining, based on the first chroma value, the second chroma value, the second difference, and the preset value, a scaling coefficient in the intra prediction model parameter corresponding to the target chroma block comprises:
   determining, based on the first chroma value, the second chroma value, the preset value, and the second difference, an initial scaling coefficient in the intra prediction model parameter corresponding to the target chroma block; and when a fourth difference between a quantity of significant bits of the initial scaling coefficient and a second preset bit depth is greater than 0, shifting the initial scaling coefficient to the right based on the fourth difference to obtain the scaling coefficient in the intra prediction model parameter corresponding to the target chroma block.

10. The method according to claim 9, wherein the shifting the initial scaling coefficient to the right based on the fourth difference to obtain the scaling coefficient in the intra prediction model parameter corresponding to the target chroma block comprises:
shifting the initial scaling coefficient to the right by bits of the fourth difference to obtain the scaling coefficient in the intra prediction model parameter corresponding to the target chroma block.

11. The method according to claim 9, further comprising:
if the fourth difference is greater than 0, determining a difference between the fourth difference and a sum of the preset value of the normalized shift parameter and a third difference as a target value of the normalized shift parameter.

12. The method according to claim 7, wherein the determining, based on the scaling coefficient, the second chroma value, a target value, and the minimum luma value, the offset factor in the intra prediction model parameter corresponding to the target chroma block comprises:
$b = minC - ((a*minY) >> k)$, wherein b is the offset factor, a is the scaling coefficient, minC is the second chroma value, minY is the minimum luma value, and k is the target value.

13. The method according to claim 1, further comprising:
if the first difference is not equal to 0, determining that a scaling coefficient in the intra prediction model parameter is 0, and determining that an offset factor in the intra prediction model parameter is the second chroma value.

14. The method according to claim 5, wherein the preset value of the normalized shift parameter is a bit depth of the first difference, a bit depth of luma samples, a sum of the bit depth of the first difference and a second preset value, a product of the bit depth of the first difference and a third preset value, or a bit depth of one byte.

15. The method according to claim 1, wherein the luma reconstruction information corresponding to the target chroma block comprises downsampling information of a luma reconstruction block corresponding to the target chroma block.

16. The method according to claim 1, wherein the first chroma value corresponds to the maximum luma value, and the second chroma value corresponds to the minimum luma value.

17. A chroma block prediction apparatus, comprising:
a non-transitory computer-readable storage medium storing instructions; and
one or more processors in communication with the non-transitory computer-readable storage medium and upon execution of the instructions, configures the apparatus to:
obtain a maximum luma value and a minimum luma value based on luma samples corresponding to neighboring samples of a target chroma block; and
if a first difference between the maximum luma value and the minimum luma value is not equal to 0, process the first difference based on a quantity of significant bits of the first difference and a first preset bit depth to obtain a second difference;
determine, based on a first chroma value, a second chroma value, and the second difference, an intra prediction model parameter corresponding to the target chroma block, wherein the first chroma value and the second chroma value are determined based on the neighboring samples of the target chroma block; and
determine prediction information of the target chroma block based on the intra prediction model parameter and luma reconstruction information corresponding to the target chroma block.

18. The apparatus according to claim 17, wherein the one or more processors are configured to:
divide a preset quantity of luma samples corresponding to a preset quantity of neighboring samples of the target chroma block into a first luma sample set and a second luma sample set, wherein a quantity of luma samples in the first luma sample set is the same as a quantity of luma samples in the second luma sample set, and luma values of the luma samples in the first luma sample set are greater than or equal to luma values of the luma samples in the second luma sample set; and
determine the maximum luma value based on the first luma sample set, and determine the minimum luma value based on the second luma sample set.

19. The apparatus according to claim 17, wherein a scaling coefficient a in the intra prediction model parameter is determined based on (maxC−minC) and a value from a lookup table, wherein maxC is the first chroma value, $minC$ is the second chroma value, and the value from the lookup table is determined based on the second difference.

20. A non-transitory computer-readable storage medium for storing bit string of a video, comprising:
a bit string stored in the non-transitory computer-readable medium, the bit string comprising an encoded sequence of frames of a video, wherein the encoded sequence of frames is encoded into the bit string based on a plurality of operations comprising:
obtaining a maximum luma value and a minimum luma value based on luma samples corresponding to neighboring samples of a target chroma block;
if a first difference between the maximum luma value and the minimum luma value is not equal to 0, processing the first difference based on a quantity of significant bits of the first difference and a first preset bit depth to obtain a second difference;
determining, based on a first chroma value, a second chroma value, and the second difference, an intra prediction model parameter corresponding to the target chroma block, wherein the first chroma value and the second chroma value are determined based on the neighboring samples of the target chroma block; and
determining prediction information of the target chroma block based on the intra prediction model parameter and luma reconstruction information corresponding to the target chroma block.

* * * * *